United States Patent
Goda et al.

(10) Patent No.: US 11,975,529 B2
(45) Date of Patent: May 7, 2024

(54) VERIFICATION APPARATUS, CONTROL METHOD THEREFOR, AND NON-TRANSITORY COMPUTER-READABLE STORAGE MEDIUM THAT PERFORM VERIFICATION FOR A FIRST REGION BY A FIRST ALGORITHM AND FOR A SECOND REGION BY A SECOND ALGORITHM

(71) Applicant: CANON KABUSHIKI KAISHA, Tokyo (JP)

(72) Inventors: Junichi Goda, Chiba (JP); Yosuke Obayashi, Chiba (JP); Minoru Kambegawa, Chiba (JP); Masanori Ichikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 485 days.

(21) Appl. No.: 17/210,717

(22) Filed: Mar. 24, 2021

(65) Prior Publication Data
US 2021/0303844 A1    Sep. 30, 2021

(30) Foreign Application Priority Data
Mar. 26, 2020   (JP) ................ 2020-056620

(51) Int. Cl.
   *B41F 33/00*    (2006.01)
(52) U.S. Cl.
   CPC ...... *B41F 33/0036* (2013.01); *G06F 2218/08* (2023.01)
(58) Field of Classification Search
   None
   See application file for complete search history.

(56) References Cited

U.S. PATENT DOCUMENTS

| | | | |
|---|---|---|---|
| 2006/0159345 A1* | 7/2006 | Clary ................ | G06V 30/1448 715/268 |
| 2018/0059603 A1* | 3/2018 | Miyahara .......... | H04N 1/00076 |
| 2019/0212955 A1 | 7/2019 | Guiterrez et al. | |

FOREIGN PATENT DOCUMENTS

| | | |
|---|---|---|
| EP | 2642738 A1 * | 9/2013 |
| EP | 2943931 A2 | 11/2015 |

(Continued)

OTHER PUBLICATIONS

Combined Search and Examination Report issued Dec. 14, 2021, in Great Britain Application No. GB2103804.7.

(Continued)

*Primary Examiner* — Fan Zhang
(74) *Attorney, Agent, or Firm* — Venable LLP

(57) ABSTRACT

A verification apparatus includes a controller to display a screen in which a reference image as a verification target image is user selectable, to set, based on user input and. on the displayed reference image, a feature point of the reference image, and a reference region of a predetermined pattern formed in advance on a recording medium on which the verification target image is to be formed, to extract the set feature point from a read image, to specify, based on a positional relationship between the feature point and the screen set reference region, from an image position of the extracted feature point, a first region on the read image, indicating a region where the predetermined pattern should have been formed, and a second region other than the first, and to perform verification for the first region by a first algorithm, and for the second region by a second algorithm.

21 Claims, 20 Drawing Sheets

(56) References Cited

FOREIGN PATENT DOCUMENTS

| | | | |
|---|---|---|---|
| JP | H0-9198503 A | | 7/1997 |
| JP | 2003-136818 A | | 5/2003 |
| JP | 2007-310567 A | | 11/2007 |
| JP | 2007310567 | * | 11/2007 |
| JP | 2011070548 | * | 4/2011 |
| JP | 2013-196456 A | | 9/2013 |
| JP | 2018-031963 A | | 3/2018 |
| JP | 2021074962 | * | 5/2021 |
| WO | 2014108460 A | | 7/2014 |

OTHER PUBLICATIONS

Japanese Office Action issued on Oct. 20, 2023, in Japanese Patent Application No. 2020-056620, with English translation (11 pages).

\* cited by examiner

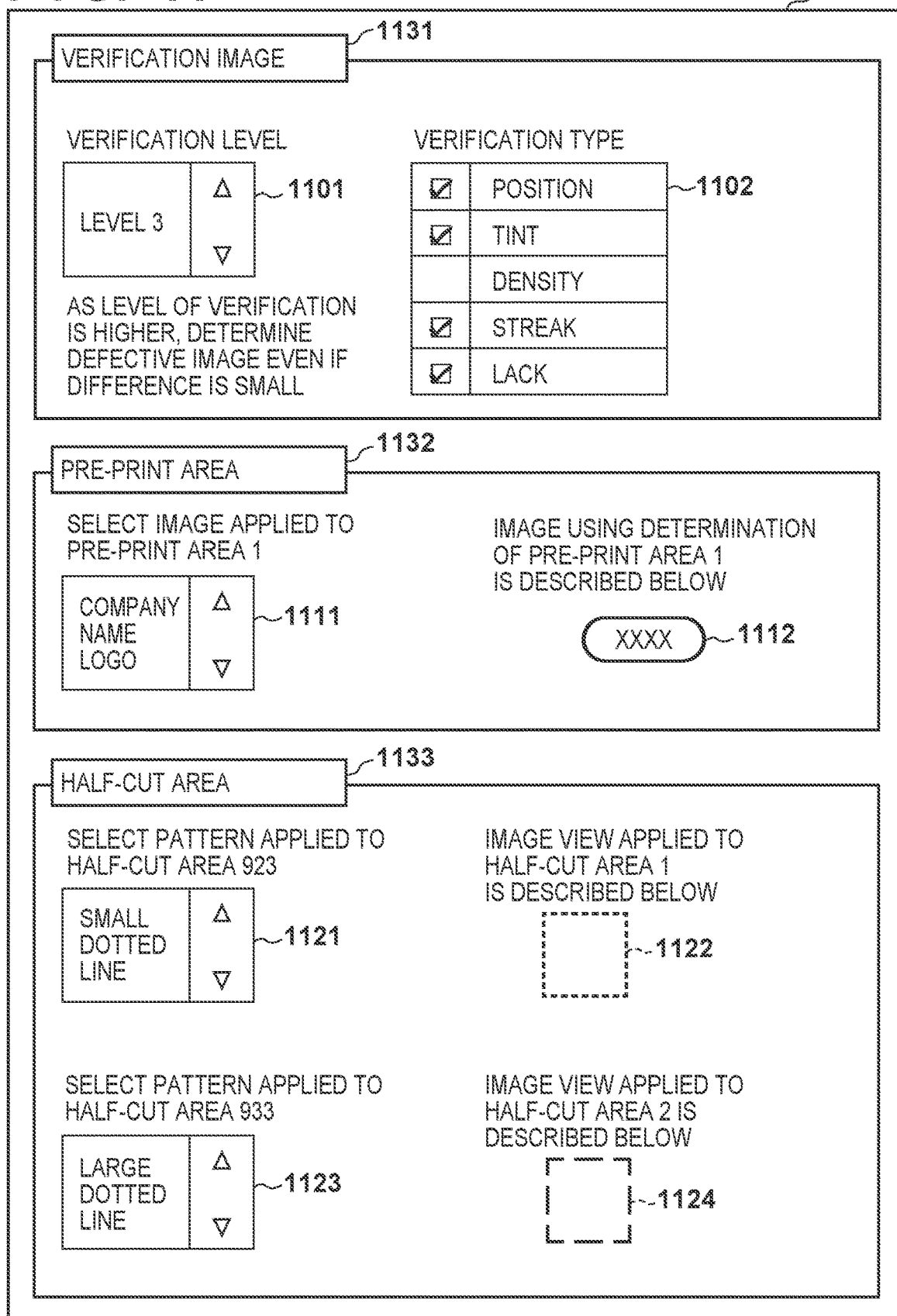

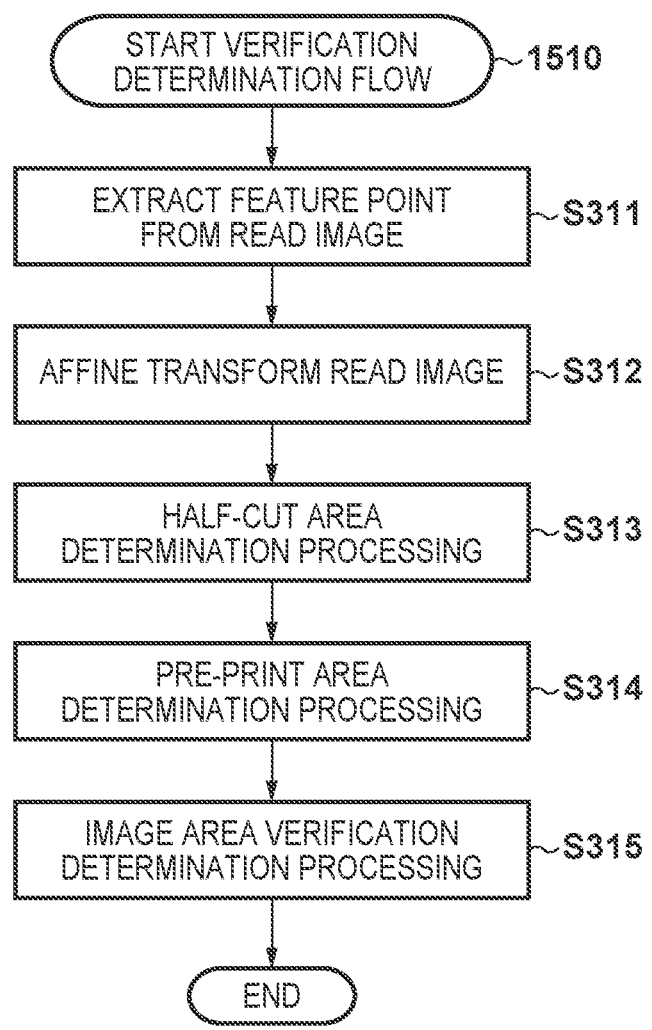

FIG. 16
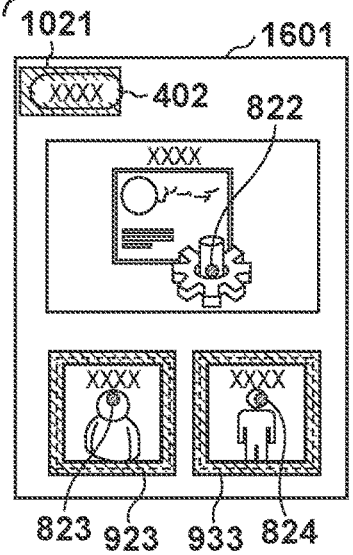
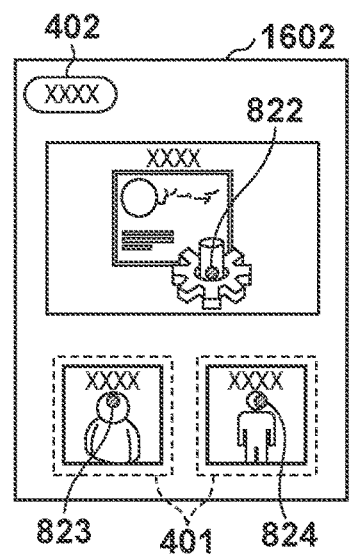 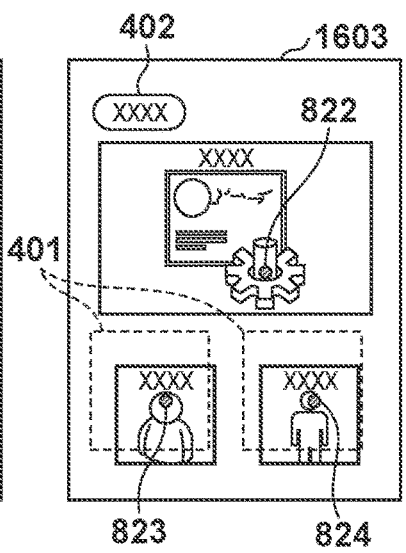 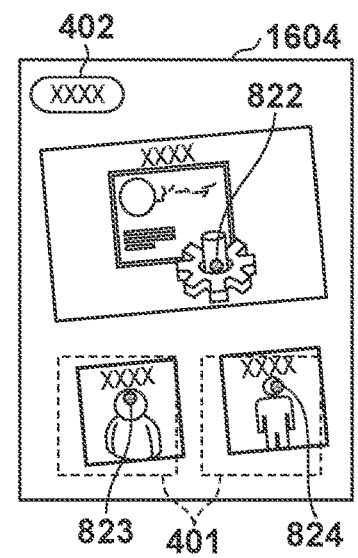
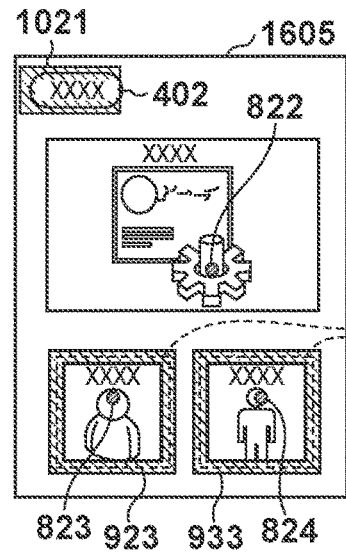 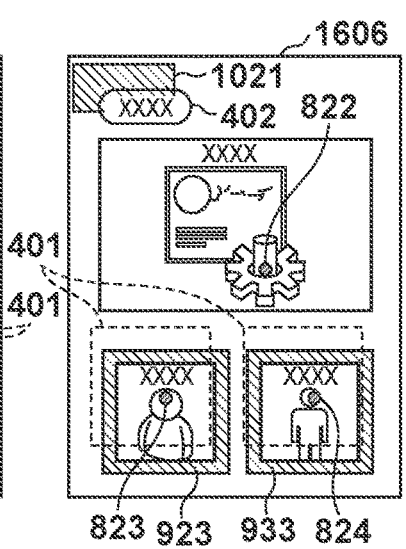 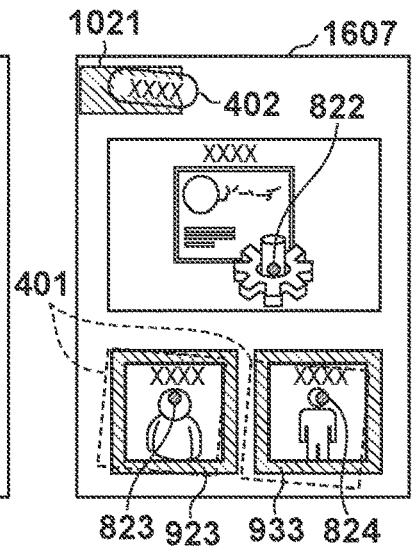

VERIFICATION APPARATUS, CONTROL METHOD THEREFOR, AND NON-TRANSITORY COMPUTER-READABLE STORAGE MEDIUM THAT PERFORM VERIFICATION FOR A FIRST REGION BY A FIRST ALGORITHM AND FOR A SECOND REGION BY A SECOND ALGORITHM

CROSS-REFERENCE TO PRIORITY APPLICATION

This application claims the benefit of Japanese Patent Application No. 2020-056620, filed Mar. 26, 2020, which is hereby incorporated by reference herein in its entirety.

BACKGROUND OF THE INVENTION

Field of the Invention

The present invention relates to a verification apparatus, a control method therefor, and a non-transitory computer-readable storage medium.

Description of the Related Art

In recent years, there is known a print system that allows a verification apparatus to inspect, during conveyance, a sheet (to be referred to as a print sheet here after) on which an image has been printed by a print apparatus. On inspection of the print sheet, the verification apparatus reads the image on the conveyed print sheet, and determines, by performing image analysis of the read image, whether printing of the print sheet is normal. The verification apparatus can detect, for example, omission of a barcode or a ruled line, a lack of an image, a print failure, a lack of a page, color misregistration, or the like. If it is determined that the print sheet is a defective sheet, the defective sheet can be discharged to a discharge destination different from that of a normal sheet. This can prevent a defective sheet from being mixed in normal sheets, thereby allowing an operator to discard the defective sheet.

An image may be printed on a label sheet in which a cut called a half-cut has been made or a preprint sheet (an image printed in advance will be referred to as a preprint image here after) on which an image has been printed in advance. Japanese Patent Laid-Open No. 2007-310567 proposes that a preprint image is excluded from a target region of image inspection when performing image inspection for a preprint sheet. When performing image inspection for a label sheet or a preprint sheet, a preprint image or a half-cut made in advance in a sheet before image printing is considered to be excluded from the target region of image inspection.

However, the above-described conventional technique has the following problem. For example, in the above-described conventional technique, if a half-cut or a preprint image is excluded from the target region of image inspection, it becomes impossible to determine whether the half-cut or the preprint image is at a correct position with respect to a print image. Especially, a positional relationship with an image is important for the half-cut when the half-cut is peeled off from a print sheet like a seal. This is because, if the position of the half-cut is largely shifted with respect to the print image, when the half-cut is peeled off, the shift of the image becomes significant.

SUMMARY OF THE INVENTION

The present invention enables realization of a mechanism of preferably inspecting the position of a half-cut or a preprint image while ensuring the quality of a print image by image inspection.

One aspect of the present invention provides a verification apparatus comprising a controller including a processor and a memory, the controller configured to set a feature point of a reference image as a verification target image, and a reference region of a predetermined pattern formed in advance on a recording medium on which the verification target image is to be formed, to extract the set feature point from a read image obtained by reading an image formed on the recording medium by a print apparatus, to specify, based on a positional relationship between the set feature point and the reference region, from an image position of the extracted feature point, a first region on the read image, which indicates a region where the predetermined pattern should have been formed, and a second region other than the first region of the read image, and to perform verification for the first region by a first algorithm, and verification for the second region by a second algorithm different from the first algorithm.

Another aspect of the present invention provides a control method for a verification apparatus, the method includes: setting a feature point of a reference image as a verification target image, and a reference region of a predetermined pattern formed in advance on a recording medium on which the verification target image is to be formed, extracting the set feature point from a read image obtained by reading an image formed on the recording medium by a print apparatus, specifying, based on a positional relationship between the feature point and the reference region both of which have been set in the setting, from an image position of the extracted feature point, a first region on the read image, which indicates a region where the predetermined pattern should have been formed, and a second region other than the first region of the read image, and performing verification for the first region by a first algorithm, and verification for the second region by a second algorithm different from the first algorithm.

Still another aspect of the present invention provides a non-transitory computer-readable storage medium storing a computer program for causing a computer to execute each step of a control method for a verification apparatus, the control method comprising setting a feature point of a reference image as a verification target image, and a reference region of a predetermined pattern formed in advance on a recording medium on which the verification target image is to be formed, extracting the set feature point from a read image obtained by reading an image formed on the recording medium by a print apparatus, specifying, based on a positional relationship between the feature point and the reference region both of which have been set in the setting, from an image position of the extracted feature point, a first region on the read image, which indicates a region where the predetermined pattern should have been formed, and a second region other than the first region of the read image, and performing verification for the first region by a first algorithm, and verification for the second region by a second algorithm different from the first algorithm.

Further features of the present invention will become apparent from the following description of exemplary embodiments (with reference to the attached drawings).

BRIEF DESCRIPTION OF THE DRAWINGS

FIG. 11 is a view showing an example of a display screen when the verification apparatus sets verification according to the embodiment;

FIGS. 15A and 15B are a flowchart illustrating a processing procedure when the verification apparatus performs verification processing according to the embodiment; and FIG. 16 is a view for explaining processing contents when the verification apparatus performs the verification processing according to the embodiment.

DESCRIPTION OF THE EMBODIMENTS

Figure 1:
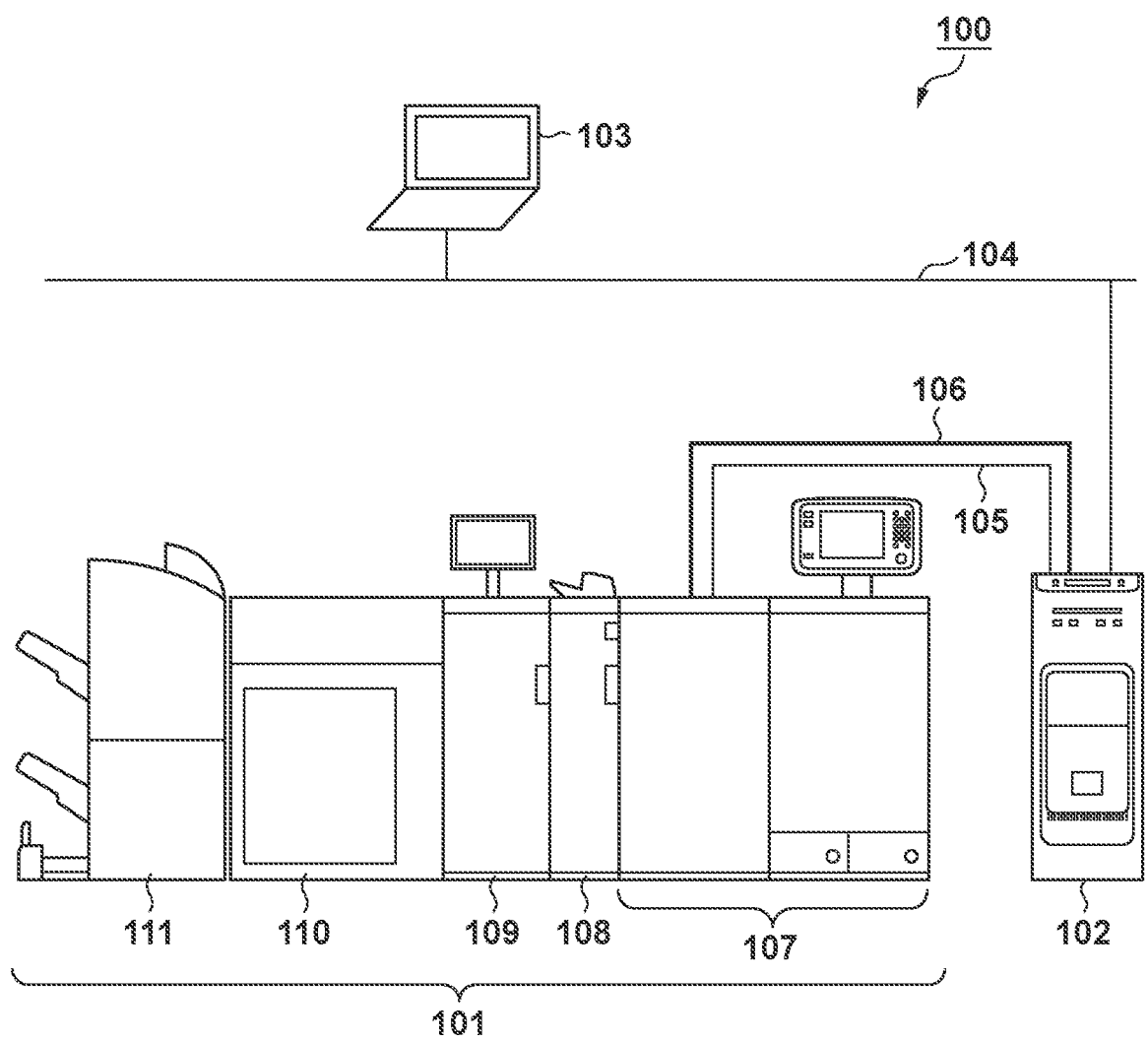
FIG. 1 is a view showing an overview of the configuration of a print system according to an embodiment.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

In the following description, an external controller will also be referred to as an image processing controller, a digital front end (DFE), a print server, or the like. The image forming apparatus will also be referred to as a multifunction peripheral or an MFP here after.

<Overview of Print System>

An embodiment of the present invention will be described below. An overview of the system configuration of a print system according to the embodiment will be described with reference to FIG. 1. A print system 100 according to the embodiment includes an image forming apparatus 101 and an external controller 102. The image forming apparatus 101 and the external controller 102 are communicably connected via an internal LAN 105 and a video cable 106. The external controller 102 is communicably connected to a client PC 103 via an external LAN 104, and a print instruction is issued from the PC 103 to the external controller 102.

A printer driver having a function of converting print data into data in a print description language processible by the external controller 102 is installed on the client PC 103. For example, a user who executes printing can issue, via the external controller 102, a print instruction to the image forming apparatus 101 through the printer driver from various applications operating on the client PC 103. The printer driver transmits print data to the external controller 102 based on the print instruction from the user. Upon receiving the print instruction from the client PC 103, the external controller 102 performs data analysis and rasterization processing, inputs the print data to the image forming apparatus 101, and then issues a print instruction.

Note that the arrangement in which the image forming apparatus 101 and the external controller 102 are separated is exemplified but does not intend to limit the present invention, and the function of the external controller 102 may be provided in the image forming apparatus 101. That is, the image forming apparatus 101 may be connected to the external LAN 104, and print data processible by the image forming apparatus 101 may be transmitted from the client PC 103. In this case, the image forming apparatus 101 performs data analysis and rasterization processing, and then executes print processing. The client PC 103 will be exemplified as a client apparatus used by the user. The present invention, however, is not limited to this. That is, the present invention is applicable to other terminals, for example, any client apparatus on which the printer driver of the image forming apparatus 101 can be installed, such as a smartphone, a tablet, or a wearable terminal.

The image forming apparatus 101 will be described next. The image forming apparatus 101 includes a print apparatus 107, an inserter 108, a verification apparatus 109, a large capacity stacker 110, and a finisher 111. In this way, the image forming apparatus 101 is connected to the plurality of apparatuses having different functions, and is configured to perform complicated print processing such as bookbinding.

The print apparatus 107 forms (prints), using toner, an image on a recording medium such as a sheet conveyed from a paper feed unit arranged in the lower portion of the print apparatus 107. The arrangement and operation principle of the print apparatus 107 are as follows. A photosensitive drum is irradiated with, as scanning light, a light beam such as a laser beam modulated in accordance with image data and reflected by a rotary polyhedral mirror such as a polygon mirror. An electrostatic latent image formed on the photosensitive drum by the laser beam is developed by toner, and the toner image is transferred to a sheet attached to a transfer drum. This series of image forming processes is executed sequentially for toners of yellow (Y), magenta (M), cyan (C), and black (K), thereby forming a full-color image on the sheet. The sheet, on which the full-color image has been formed, on the transfer drum is transferred to a fixing unit. The fixing unit includes rollers and belts, incorporates a heat source such as a halogen heater in each roller, and melts and fixes, to the sheet, by heat and a pressure, the toners on the sheet to which the toner images have been transferred.

The inserter 108 is an apparatus for inserting, at an arbitrary position, an insertion sheet to a group of sheets printed in the print apparatus 107 and then conveyed. The verification apparatus 109 is an apparatus for determining whether the printed image is normal or not by reading the image on the conveyed sheet and comparing the read image with a preregistered reference image. Note that, although details will be described later, the verification apparatus 109 verifies a predetermined pattern formed in advance on the sheet, for example, a half-cut, a preprint image, or the like, in addition to the above-described determination processing. The large capacity stacker 110 is a stacker on which a large number of sheets can be stacked. The finisher 111 is an apparatus that executes finishing processing for the conveyed sheets. The finisher 111 can perform finishing such as stapling, punching, or saddle stitch processing, and discharges the processed printed products to a discharge tray.

<Details of System Configuration>

Figure 2:
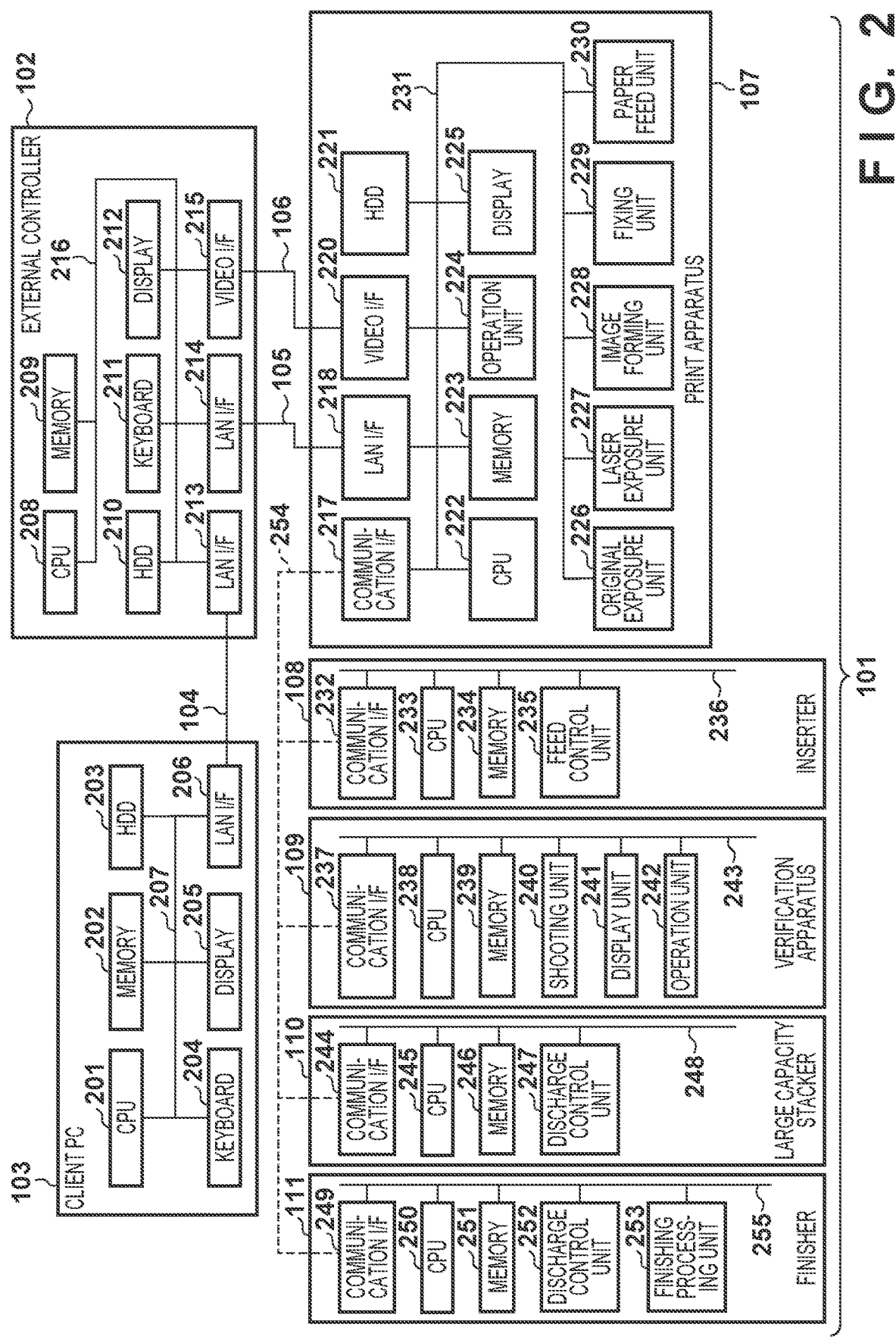
FIG. 2 is a block diagram showing the detailed system configuration of the print system according to the embodiment.

The detailed system configuration of the print system according to this embodiment will be described next with reference to FIG. 2. The arrangement of the print apparatus 107 of the image forming apparatus 101 will first be described. The print apparatus 107 of the image forming apparatus 101 includes a communication OF 217, a LAN OF 218, a video I/F 220, an HDD 221, a CPU 222, a memory 223, an operation unit 224, and a display 225. Furthermore, the print apparatus 107 of the image forming apparatus 101 includes an original exposure unit 226, a laser exposure unit 227, an image forming unit 228, a fixing unit 229, and a paper feed unit 230. The respective components are connected via a system bus 231.

The communication OF 217 is connected to the inserter 108, the verification apparatus 109, the large capacity stacker 110, and the finisher 111 via a communication cable 254, and is used to perform communication for controlling each apparatus. The LAN OF 218 is connected to the external controller 102 via the internal LAN 105, and is used to communicate print data and the like. The video OF 220 is connected to the external controller 102 via the video cable 106, and is used to communicate image data and the like.

The HDD (Hard Disk Drive) 221 is a storage device that saves programs and data. The CPU 222 collectively controls image processing and printing based on the programs, and the like, saved in the HDD 221. The memory 223 stores programs necessary for the CPU 222 to perform various kinds of processes, and image data, and also operates as a work area. The operation unit 224 accepts input of various settings and operation instructions from the user. Setting information of an image processing apparatus, the processing status of a print job, and the like, are displayed on the display 225.

The original exposure unit 226 executes processing of reading an original when a copy function or a scan function is used. More specifically, the original exposure unit 226 reads original data by shooting an image by a CCD camera while illuminating, with an exposure lump, a sheet set by the user. The laser exposure unit 227 is an apparatus that performs primary charging for irradiating the photosensitive drum with a laser beam to transfer a toner image, and laser exposure. The laser exposure unit 227 first performs primary charging of charging the surface of the photosensitive drum to an even negative potential. Next, a laser driver irradiates the photosensitive drum with a laser beam while adjusting the angle of reflection by a polygon mirror. This neutralizes negative charges in the irradiated portion, thereby forming an electrostatic latent image on the surface of the photosensitive drum. The image forming unit 228 is an apparatus for transferring the toner to the sheet, which includes a developing unit, a transfer unit, and a toner replenishment unit, and transfers the toner on the photosensitive drum to the sheet. The developing unit forms a visible image by applying the negatively charged toner from a developing cylinder to the electrostatic latent image on the surface of the photosensitive drum. The transfer unit performs primary transfer of transferring the toner on the surface of the photosensitive drum to the transfer belt by applying a positive potential to a primary transfer roller, and secondary transfer of transferring the toner on the transfer belt to the sheet by applying a positive potential to a secondary transfer outer roller. The fixing unit 229 is an apparatus that melts and fixes, to the sheet, the toner on the sheet by heat and a pressure, and includes a heater, a fixing belt, and a pressure belt. The paper feed unit 230 is an apparatus that feeds a sheet, and controls a feeding operation and a conveyance operation of the sheet using the rollers and various sensors.

The arrangement of the inserter 108 of the image forming apparatus 101 will be described next. The inserter 108 of the image forming apparatus 101 includes a communication OF 232, a CPU 233, a memory 234, and a feed control unit 235. These components are connected via a system bus 236. The communication I/F 232 is connected to the print apparatus 107 via the communication cable 254, and performs communication necessary for control. The CPU 233 performs various control operations necessary for paper feed in accordance with a control program stored in the memory 234. The memory 234 is a storage device that saves the control program. The feed control unit 235 controls feed and conveyance of the sheet conveyed from the paper feed unit of the inserter 108 or the print apparatus 107 while controlling the rollers and sensors based on an instruction from the CPU 233.

The arrangement of the verification apparatus 109 of the image forming apparatus 101 will be described next. The verification apparatus 109 of the image forming apparatus 101 includes a communication OF 237, a CPU 238, a memory 239, a shooting unit 240, a display unit 241, and an operation unit 242, and these components are connected via a system bus 243. The communication OF 237 is connected to the print apparatus 107 via the communication cable 254, and performs communication necessary for control. The CPU 238 performs various control operations necessary for verification in accordance with a control program stored in the memory 239. The memory 239 is a storage device that saves the control program. The shooting unit 240 shoots the conveyed sheet in accordance with an instruction of the CPU 238. The CPU 238 determines whether the printed image is normal by comparing the image shot by the shooting unit 240 with the reference image saved in the memory 239. A verification result, a setting screen, and the like, are displayed on the display unit 241. The operation unit 242 is operated by the user and accepts instructions such as a setting change instruction of the verification apparatus 109 and a registration instruction of the reference image.

The arrangement of the large capacity stacker 110 of the image forming apparatus 101 will be described next. The large capacity stacker 110 of the image forming apparatus 101 includes a communication OF 244, a CPU 245, a memory 246, and a discharge control unit 247, and these components are connected via a system bus 248. The communication OF 244 is connected to the print apparatus 107 via the communication cable 254, and performs communication necessary for control. The CPU 245 performs various control operations necessary for discharge in accordance with a control program stored in the memory 246. The memory 246 is a storage device that saves the control program. The discharge control unit 247 executes control of conveying the conveyed sheet to a stack tray, an escape tray, or the subsequent finisher 111 based on an instruction from the CPU 245.

The arrangement of the finisher 111 of the image forming apparatus 101 will be described next. The finisher 111 of the image forming apparatus 101 includes a communication OF 249, a CPU 250, a memory 251, a discharge control unit 252, and a finishing processing unit 253, and these components are connected via a system bus 255. The communication OF 249 is connected to the print apparatus 107 via the communication cable 254, and performs communication necessary for control. The CPU 250 performs various control operations necessary for finishing or discharge in accordance with a control program stored in the memory 251. The memory 251 is a storage device that saves the control program. The discharge control unit 252 controls conveyance and discharge of the sheet based on an instruction from the CPU 250. The finishing processing unit 253 performs finishing processing such as stapling, punching, or saddle stitch processing based on an instruction from the CPU 250.

The arrangement of the external controller 102 will be described next. The external controller 102 includes a CPU 208, a memory 209, an HDD 210, a keyboard 211, a display 212, LAN I/Fs 213 and 214, and a video OF 215, which are connected via a system bus 216. The CPU 208 collectively executes processing such as reception of print data from the client PC 103, RIP processing, and transmission of print data to the image forming apparatus 101 based on programs and data saved in the HDD 210. The memory 209 stores programs and data necessary for the CPU 208 to perform various kinds of processes, and operates as a work area. The HDD 210 stores programs and data necessary for an operation such as a print processing. The keyboard 211 is an apparatus used to input an operation instruction of the external controller 102. Information of an execution application of the external controller 102, or the like, is displayed on the display 212 by a video signal of a moving image or a still image. The LAN OF 213 is connected to the client PC 103 via the external LAN 104, and is used to communicate a print instruction, and the like. The LAN OF 214 is connected to the image forming apparatus 101 via the internal LAN 105, and is used to communicate a print instruction, and the like. The video OF 215 is connected to the image forming apparatus 101 via the video cable 106, and is used to communicate print data and the like.

The arrangement of the client PC 103 will be described next. The client PC 103 includes a CPU 201, a memory 202, an HDD 203, a keyboard 204, a display 205, and a LAN OF 206, which are connected via a system bus 207. The CPU 201 creates print data or executes a print instruction based on a document processing program saved in the HDD 203. The CPU 201 collectively controls the respective devices connected to the system bus. The memory 202 stores programs and data necessary for the CPU 201 to perform various kinds of processes, and operates as a work area. The HDD 203 stores programs and data necessary for an operation such as print processing. The keyboard 204 is an apparatus used to input an operation instruction of the PC 103. Information of an execution application of the client PC 103, or the like, is displayed on the display 205 by a video signal of a moving image or a still image. The LAN OF 206 is connected to the external LAN 104, and is used to communicate a print instruction and the like.

Each of the internal LAN 105 and the video cable 106 is connected between the external controller 102 and the image forming apparatus 101. However, any arrangement in which data necessary for printing can be transmitted/received is possible, and, for example, an arrangement in which only the vide cable is connected may be adopted. Each of the memories 202, 209, 223, 234, 239, 246, and 251 need only be a storage device that holds data and programs. For example, each memory may be replaced by a volatile RAM, a nonvolatile ROM, an internal HDD, an external HDD, a USB memory, or the like.

<Detailed Arrangement of Image Forming Apparatus>

Figure 3:
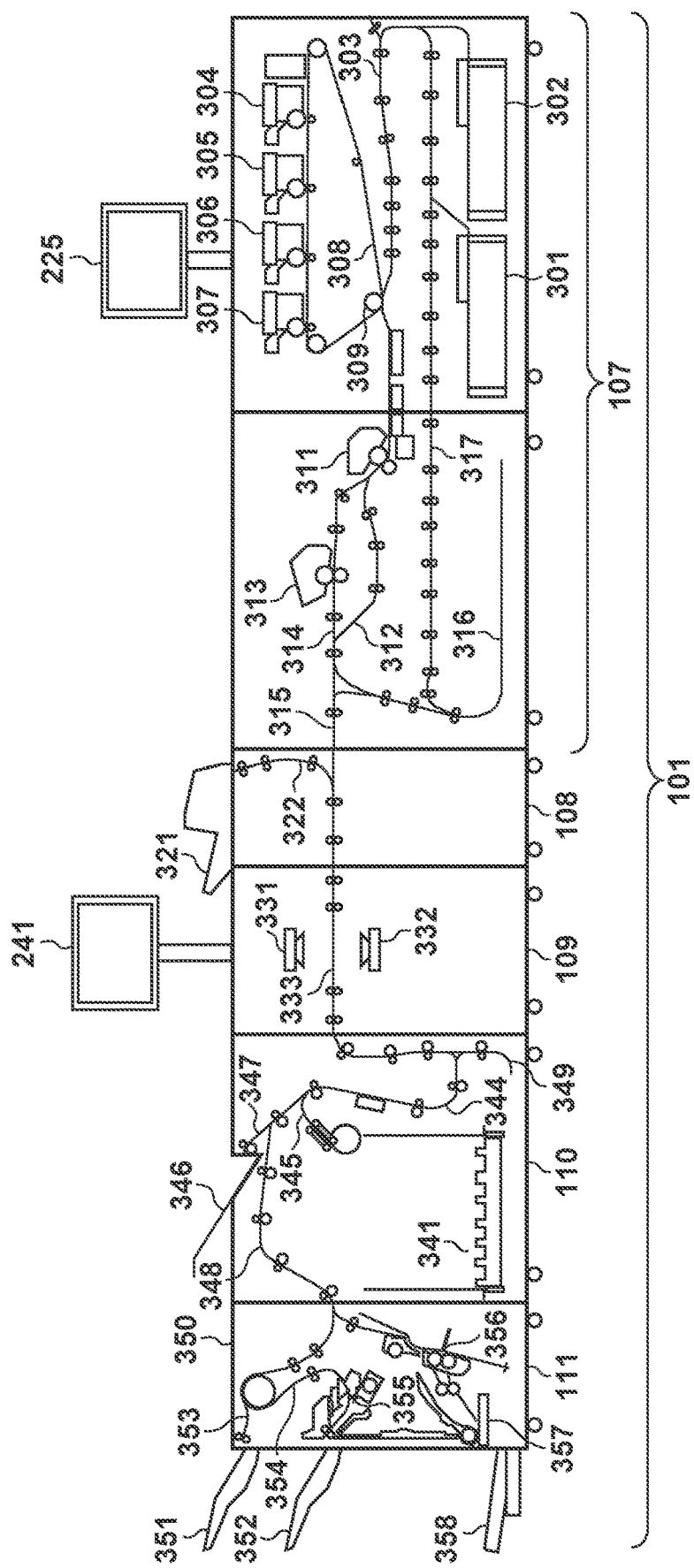
FIG. 3 is a schematic view showing the mechanical cross section of an image forming apparatus according to the embodiment.

The detailed arrangement of the image forming apparatus 101 will be described next with reference to FIG. 3. FIG. 3 shows the mechanical cross section of the image forming apparatus 101. Paper feed decks 301 and 302 are provided in the print apparatus 107. Various kinds of sheets can be stored in the respective paper feed decks 301 and 302. In each paper feed deck, only the uppermost sheet of the stored sheets can be separated and conveyed to a sheet conveyance path 303. Developing stations 304 to 307 form toner images using color toners of Y, M, C, and K, respectively, to form a color image. The formed toner images undergo primary transfer to an intermediate transfer belt 308, and the intermediate transfer belt 308 rotates the images clockwise, thereby transferring, at a secondary transfer position 309, the toner images to the sheet conveyed from the sheet conveyance path 303.

The display (display unit) 225 displays the print status of the image forming apparatus 101 and information for setting. A fixing unit 311 fixes the toner images to the sheet. The fixing unit 311 includes a pressure roller and a heating roller, and fixes the toner images to the sheet by melting/pressing the toners when the sheet passes between the rollers. The sheet having passed through the fixing unit 311 is conveyed to a point 315 through a sheet conveyance path 312. The sheet conveyed to the point 315 is conveyed to an apparatus connected to the print apparatus 107, in this embodiment, conveyed to the conveyance path of the inserter 108 as an example. If further melting/pressing is required for fixing in accordance with the type of sheet, the sheet having passed through the fixing unit 311 is conveyed to a second fixing unit 313 using an upper sheet conveyance path, additionally melted/pressed, and then conveyed to the point 315 through a sheet conveyance path 314. If an image formation mode is a double-sided mode, the sheet is conveyed to a sheet inverting path 316, inverted in the sheet inverting path 316, and then conveyed to a double-sided conveyance path 317, thereby transferring an image of the second surface at the secondary transfer position 309.

The inserter 108 includes an inserter tray 321, and makes the sheet fed from the inserter tray 321 through a sheet conveyance path 322 merge with a conveyance path. This makes it possible to insert, at an arbitrary position, the insertion sheet to the group of sheets conveyed from the print apparatus 107 (point 315), and convey the sheets to a subsequent apparatus.

The sheets having passed through the inserter 108 are conveyed to the verification apparatus 109. Cameras 331 and 332 are arranged in the verification apparatus 109 to face each other via the conveyance path. The camera 331 is a camera used to read the upper surface of the sheet, and the camera 332 is a camera used to read the lower surface of the sheet. The verification apparatus 109 can determine whether the image of the apparatus is normal by reading the image of the sheet using the camera 331 or 332 at a timing when the sheet conveyed to a sheet conveyance path 333 reaches a predetermined position. The result of verification performed by the verification apparatus 109, and the like, may be displayed on the display unit 241. The verification result may be displayed on another display device or transmitted to an external apparatus via the network, as a matter of course.

The large capacity stacker 110 includes a stack tray 341 as a tray on which a sheet is stacked. The sheet having passed through the verification apparatus 109 is input to the large capacity stacker 110 through a sheet conveyance path 344. The sheet is conveyed from the sheet conveyance path 344 via a sheet conveyance path 345, and stacked on the stack tray 341. The large capacity stacker 110 further includes an escape tray 346 as a discharge tray. The escape tray 346 is a discharge tray used to discharge a sheet that has been determined as a defective sheet by the verification apparatus 109. When outputting the sheet to the escape tray 346, the sheet is conveyed from the sheet conveyance path 344 to the escape tray 346 via a sheet conveyance path 347. Note that, when conveying the sheet to a post processing apparatus of the succeeding stage of the large capacity stacker 110, the sheet is conveyed via a sheet conveyance path 348. An inverting unit 349 is used to invert the sheet. This inverting unit 349 is used to stack the sheet on the stack tray 341. When stacking the sheet on the stack tray 341, the sheet is inverted in the inverting unit 349 so that the direction of the input sheet is the same as that of the sheet at the time of output. When conveying the sheet to the escape tray 346 or the subsequent post processing apparatus, the sheet is discharged intact without being inverted at the time of stacking, and thus the inverting operation in the inverting unit 349 is not performed.

The finisher 111 executes finishing processing for the conveyed sheets in accordance with a function designated by the user. The finisher 111 has, for example, finishing functions such as a stapling function (1- or 2-point stapling), a punching function (two or three holes), and a saddle stitch function. The finisher 111 includes two discharge trays 351 and 352, and outputs the sheets to the discharge tray 351 via a sheet conveyance path 353. However, the finishing processing such as stapling processing cannot be performed in the sheet conveyance path 353. If the finishing processing such as stapling processing is performed, the finishing function designated by the user is executed in a processing unit 355 through a sheet conveyance path 354, and then the sheets after the processing are output to the discharge tray 352. Each of the discharge trays 351 and 352 is configured to be movable vertically. The finisher 111 can also operate to stack, on the discharge tray 351, the sheets having undergone the finishing processing by the processing unit 355 by moving the discharge tray 351 downward. If the saddle stitch processing is designated, stapling processing is performed at the center of the sheets in a saddle stitch processing unit 356, and then the sheets are two-folded and output to a saddle stitch tray 358 via a sheet conveyance path 357. The bookbinding tray 358 has a belt conveyer arrangement that conveys a saddle-stitched sheet bundle stacked on the bookbinding tray 358 to the left side.

<Verification Apparatus 109>

Contents inspected by the verification apparatus 109 according to this embodiment will be described next with reference to FIG. 4. In addition to inspection of a print image, cases in which the position of a half-cut or a preprint image is and is not shifted will be described by including a factor that actually causes the shift.

Figure 4:
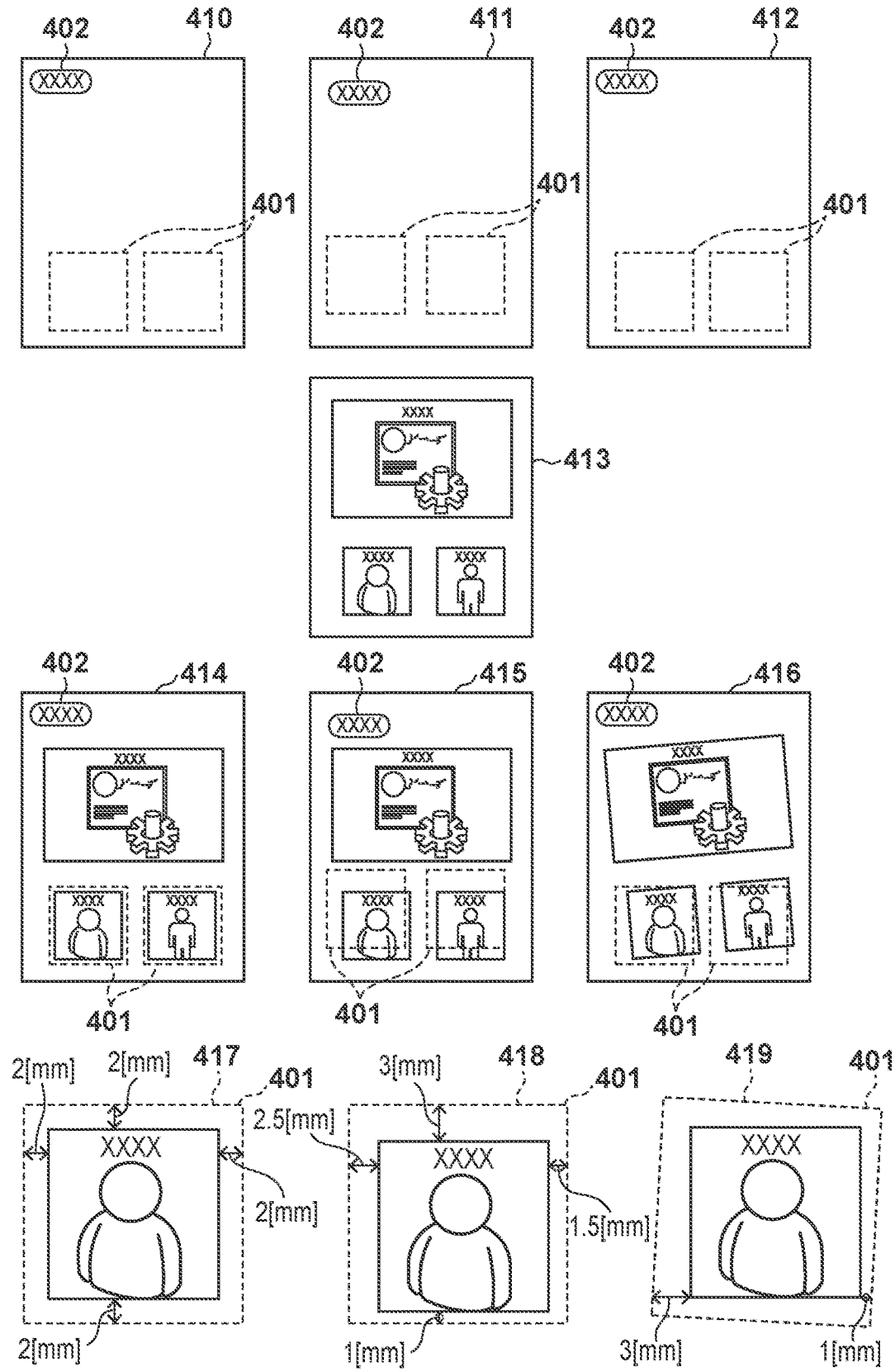
FIG. 4 is a view showing contents inspected by a verification apparatus according to the embodiment.

In FIG. 4, reference numerals 410, 411, and 412 denote sheets before printing, respectively, 401, a half-cut, and 402, a preprint image. The sheet 410 is an example of a sheet in which the half-cuts (for example, person 1, person 2) 401 and the preprint image (for example, company name logo) 402 are at ideal positions (reference regions) in the sheet before printing. The sheet 411 is a sheet before printing in a state in which the half-cuts 401 and the preprint image 402 are shifted and are not at the ideal positions with respect to the sheet 410. The sheet 412 is the same as the sheet 410, and is a sheet in which the half-cuts 401 and the preprint image 402 are formed at the ideal positions. When printing an image, the sheets 410 to 412 are set on the paper feed deck 301 or 302. In this way, when printing the half-cuts 401 and the preprint image 402 on the print sheet, a slight shift unwantedly occurs.

Sheets 414 to 416 indicate the states of the print sheets after printing an image 413 by the print apparatus 107 on sheets before printing indicated by the sheets 410 to 412, respectively. A sheet finally output after printing the image on the sheet before printing will be referred to as a final sheet. The sheets 414 and 415 are examples of the final sheets when the image can be printed at the ideal position on the sheets 410 and 411. The sheet 416 is an example of the final sheet when the image cannot be printed at the ideal position on the sheet 412.

Since, on the sheet 414, the half-cuts 401 and the preprint image 402 are at the ideal positions on the sheet before printing and the image is printed at the ideal position, the positional relationship between the image and the half-cuts 401 and preprint image 402 is in an ideal state. Since, on the sheet 415, the half-cuts 401 and the preprint image 402 are printed at positions deviated from the ideal positions on the sheet before printing, the half-cuts 401 and the preprint image 402 are unwantedly shifted with respect to the ideally printed image on the sheet after printing the image. On the sheet 416, the half-cuts 401 and the preprint image 402 are at the ideal positions on the sheet before printing, but the position at which the image is formed is shifted when printing the image. Therefore, on the sheet after printing the image, the half-cuts 401 and the preprint image 402 are shifted with respect to the image. When printing the image on the sheet, a slight shift from the ideal position may unwantedly occur due to sheet conveyance in the image forming apparatus 101.

In each of views 417 to 419, a shift between the half-cut 401 and person 1 as a lower left image on each of the sheets 414 to 416 is specifically indicated. The view 417 shows a state in which the positional relationship between the half-cut and person 1 is ideal. The views 418 and 419 each shows a position state in which the image of person 1 falls within the half-cut 401, but is not at the center with respect to the four sides of the half-cut after actually turning over the half-cut.

The verification apparatus 109 according to the present invention causes the user to set an allowable range of the views 417 to 419 while inspecting the print image (in FIG. 4, person 1, person 2, and image A). That is, in addition to the quality of the image, the verification apparatus 109 inspects whether the positional relationship with the half-cut 401 or the preprint image 402 is ensured.

Display Example

Display screens in the verification apparatus 109 according to this embodiment will be described below with reference to FIGS. 5 to 12. Each of these display screens is displayed based on an instruction of the CPU 238 of the verification apparatus 109. The verification apparatus 109 inspects the sent final sheet in accordance with preset inspection items. The final sheet is inspected by comparing a sent sheet image with a preset reference image. Examples of a comparison method of the final sheet are a method of comparing pixel values for each image position, a method of comparing the positions of objects by edge detection, and a method of extracting character data by OCR (Optical Character Recognition). The inspection items include a shift of a print position, the tint of the image, the density of the image, a streak or thin spot, and a lack of printing.

Figure 5:
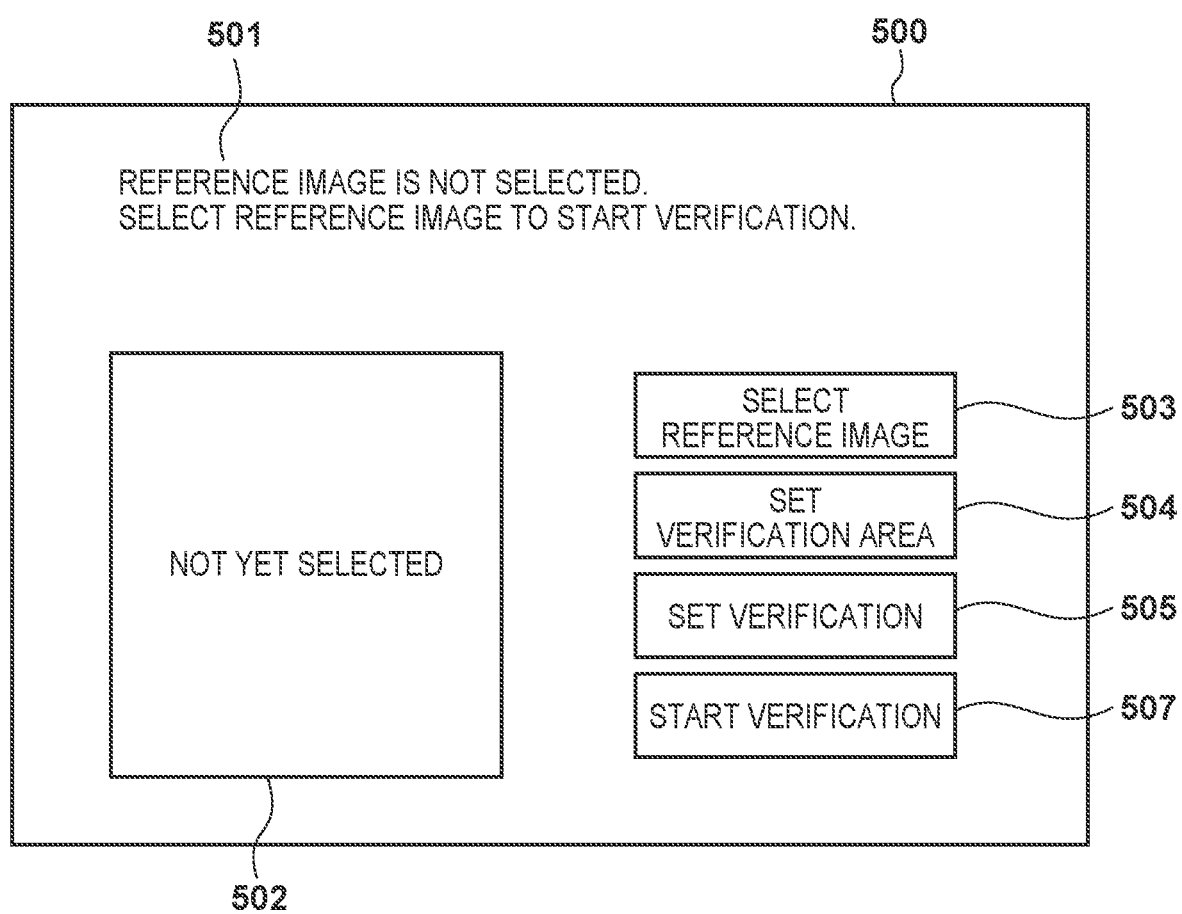
FIG. 5 is a view showing an example of a display screen before the verification apparatus selects a reference image according to the embodiment.

FIG. 5 shows an example of a screen displayed on the display unit 241 when the verification apparatus 109 is activated. A screen 500 includes display of components 501 to 507. In 501, information indicating that no reference image has been selected, and it is thus necessary to select a reference image to start verification is displayed. If the reference image has been selected, information indicating that it is possible to start verification is displayed. In the display portion 502, the selected reference image is displayed. In FIG. 5, no reference image has been selected, and thus information indicating this is displayed.

The button 503 is used to call a reference image selection screen. As the reference image, an image to be compared with an image read by the verification apparatus 109, and obtained by reading the final sheet determined, in advance, visually or by the verification apparatus 109, to have normally been printed is desirably registered. The reference image is registered in, for example, the memory 239. The reference image may be read out from an external apparatus when performing verification, as a matter of course. The button 504 is used to call a verification area setting screen. The user designates, for determining that there is no problem, a region of a position at which the half-cut 401 or the preprint image 402 is located on the final sheet. The button 505 is used to call a verification setting screen. Verification items, verification accuracy (the degree of difference with respect to the reference image at which the image is determined as a defective image), what is applied to the half-cut or the preprint image, and the like, are set in accordance with the verification purpose of the user. The button 507 is used to instruct to start verification. When verification starts, the verification apparatus 109 starts inspection of the sent final sheet. Note that printing may be executed in the print apparatus 107 after the start of verification or may be executed in advance.

Figure 6:
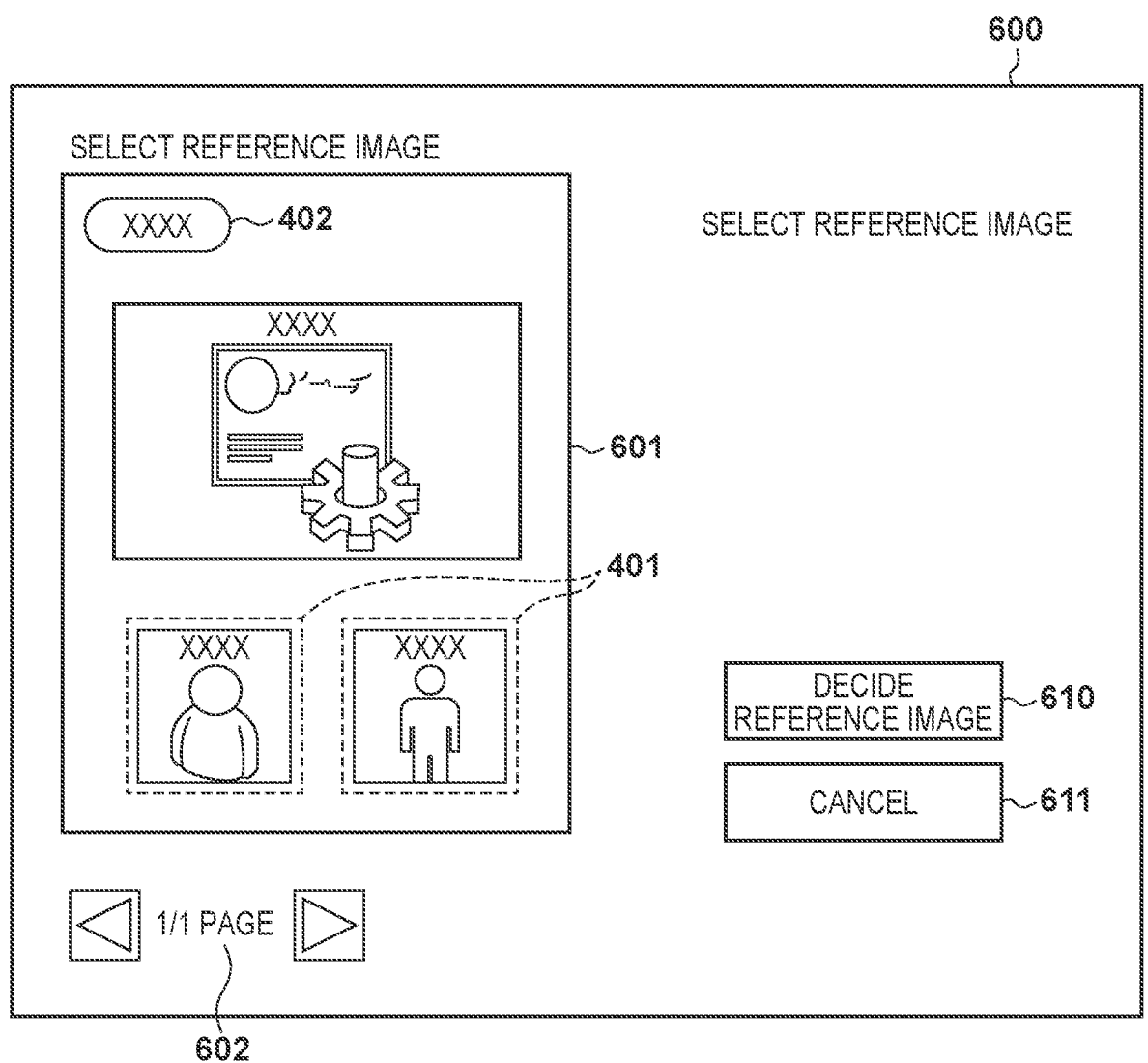
FIG. 6 is a view showing an example of a display screen when the verification apparatus selects the reference image according to the embodiment.

FIG. 6 shows an example of a screen displayed on the display unit 241 of the verification apparatus 109 when selecting a reference image. A screen 600 is a screen for selecting a reference image, which is displayed when the button 503 of FIG. 5 is operated (pressed). The screen 600 includes display of components 601, 602, 610, and 611.

In the display portion 601, the reference image registered in the memory 239 of the verification apparatus 109 is displayed, and an image to be selected as a reference image can be switched by the switching buttons 602. The example of FIG. 6 shows a case in which a reference image corresponding to the final sheet of the sheet 414 is selected. As described above, according to this embodiment, a plurality of reference images can be registered in the memory 239, or the like, and the user can select a reference image as a comparison target from the reference images. The button 610 is used to instruct to decide the selected reference image. When the button 610 is operated, the verification apparatus 109 decides the reference image, and the display returns to the screen 500. The button 611 is used to cancel the selection of the reference image. When the button 611 is operated, the verification apparatus 109 selects no reference image, and the display returns to the screen 500.

Figure 7A:
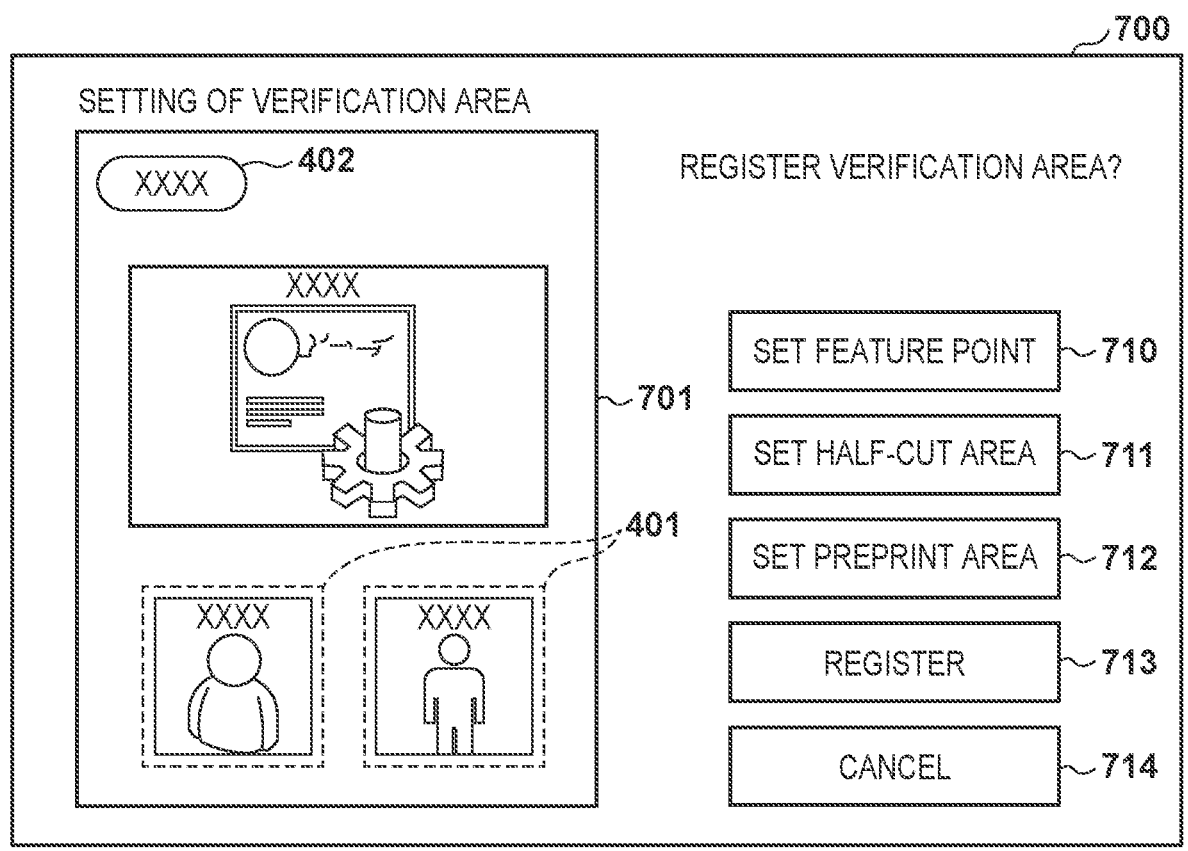
FIGS. 7A and 7B are a view showing examples of a display screen when the verification apparatus sets a verification area according to the embodiment.
Figure 7B:
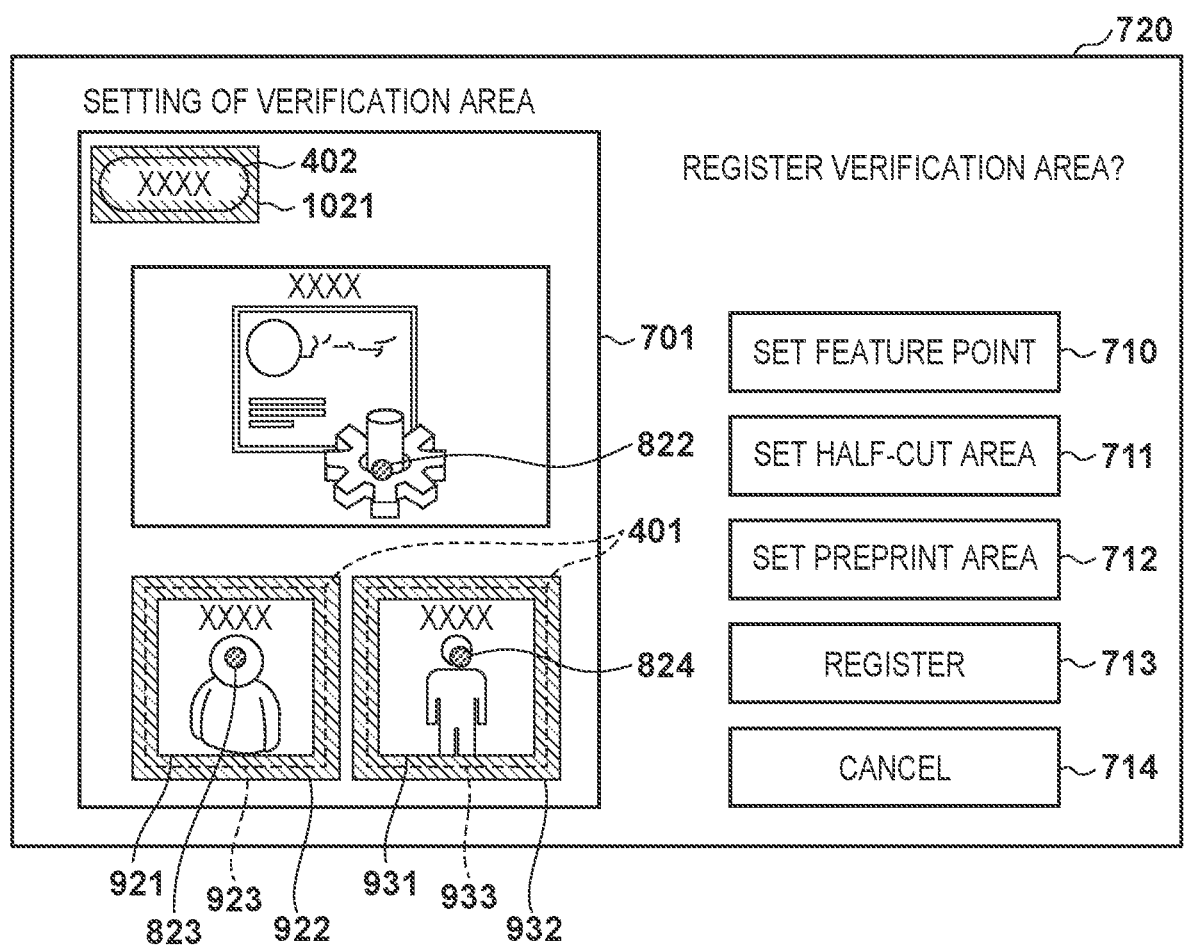

FIGS. 7A and 7B show examples of a screen displayed on the display unit 241 of the verification apparatus 109 when setting a verification area. A screen 700 is displayed when the button 504 of FIG. 5 is operated, and is used to set a verification area. This verification area indicates a region representing a reference region where a half-cut or a preprint image as a predetermined pattern should have been formed in advance. That is, the set verification area is a target area for which it is determined in verification whether the half-cut or preprint image, which should have been formed in advance, exists in the area. The screen 700 includes display of components 701 and 710 to 714.

In the display portion 701, a result of setting a verification area is displayed. In the display portion 701 shown in FIGS. 7A and 7B, no verification area has been set, and a state in which the reference image selected in FIG. 6 is displayed as an example remains set. If no verification area has been set (that is, in a default setting), a setting of inspecting the final sheet read for verification and the entire reference image is made. That is, the entire region of the reference image is set as a verification area.

The button 710 is used to call a screen for setting a specific position in the reference image as a feature point. The set feature point is used as a feature point for alignment between the reference image and the final sheet read for verification in the verification procedure of the verification apparatus 109 shown in FIGS. 15A and 15B (to be described later). Note that a feature point at a position close to the half-cut or preprint image as much as possible is desirably selected as a feature point. This is because a half-cut area or a preprint area is specified from the feature point, and thus an error when specifying the area can be minimized as the feature point is closer to the position of the half-cut area or preprint area. The button 711 is used to call a screen for setting an area to be registered as a half-cut area. In the example of FIG. 4, the allowable range of the positional shift of the half-cut with respect to the image of person 1 on each of the sheets 417 to 419 is set. The button 712 is used to call a screen for setting an area to be registered as a preprint area. In the example of FIG. 4, the allowable range of a positional shift of the preprint image 402, in which a company name logo is described, with respect to the print image is set.

The button 713 is used to register setting values (to be described later with reference to FIGS. 8 to 10) set when the buttons 710 to 712 are operated. When the button 713 is operated, the display returns to the screen 500. The button 714 is used to cancel the registration of the verification area. When the button 714 is operated, the verification apparatus 109 selects no reference image, and the display returns to the screen 500.

A screen 720 of FIG. 7B shows an example of a case in which the verification area is set in FIGS. 8 to 10 (to be described later). The screen 720 is different from the screen 700 in terms of only the state of the display portion 701. The screen 720 will be described after describing FIGS. 8 to 10.

Figure 8:
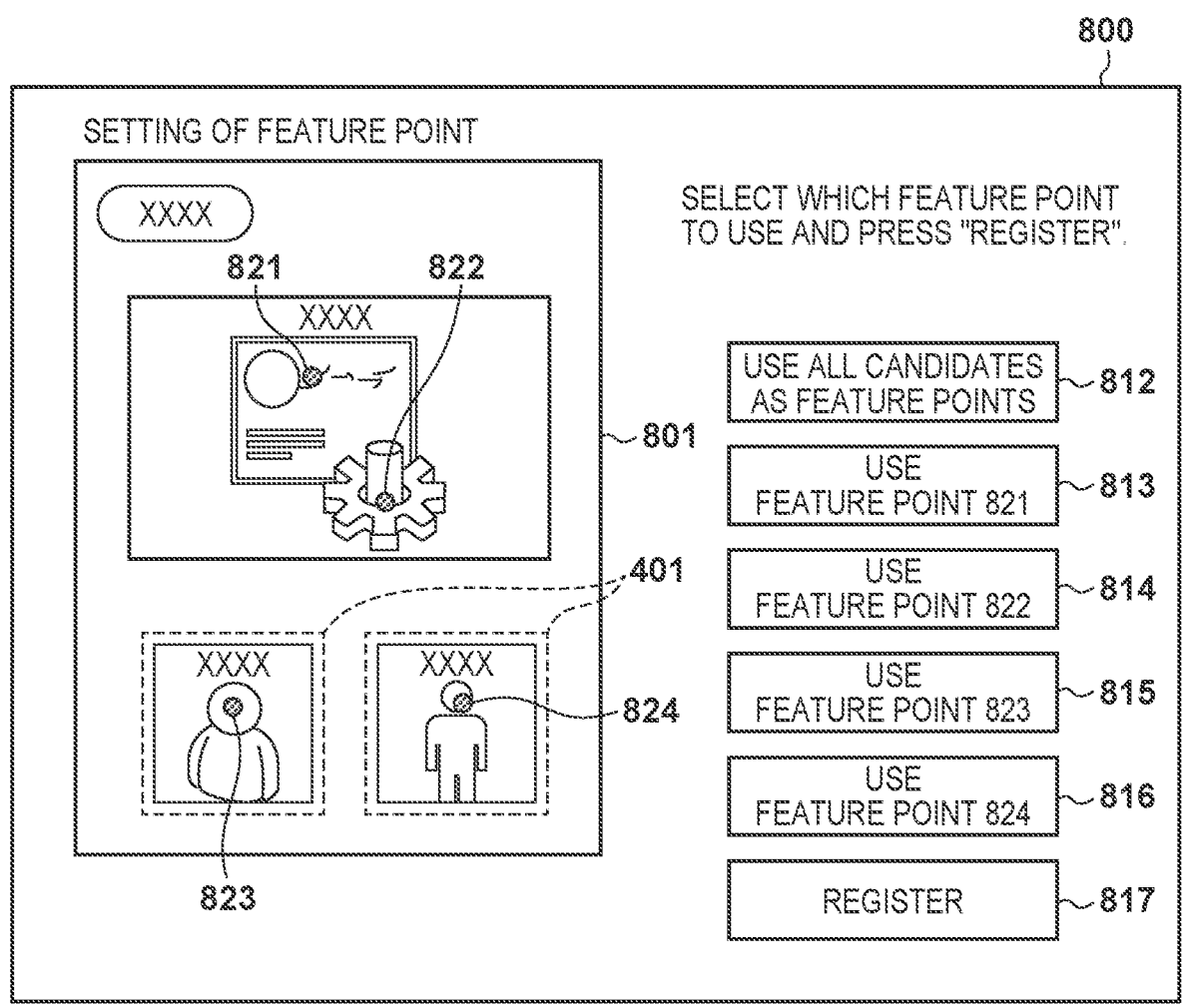
FIG. 8 is a view showing an example of a display screen when the verification apparatus sets, as a feature point, a specific point in the reference image according to the embodiment.

FIG. 8 shows an example of a screen displayed on the display unit 241 of the verification apparatus 109 when setting, as a feature point, a specific position in the reference image. A screen 800 is displayed when the button 710 of FIGS. 7A and 7B is operated. The screen 800 includes display of components 801 and 812 to 817.

In the display portion 801, candidates of a feature point to be used are displayed. In this example, four feature point 821 to 824 are candidates. As the feature point candidates, a plurality of feature point candidates that can be extracted at the time of registering the reference image are extracted by a general feature point extraction algorithm. Therefore, when transitioning to the screen 800, the feature point candidates are displayed by default. Note that a reference image in the display portion 801 includes images of image A, person 1, and person 2, but one or more feature points are extracted and displayed for each of all the images. Note that no feature image needs to be displayed for an image such as a lattice image without any feature point in which a pattern is repeated. Alternatively, the central point of the image may be selected by default.

The button 812 is used to set whether to use all the candidates as feature points. The buttons 813 to 816 are used to individually set whether to use each of the feature points 821 to 824 as a feature point. That is, it is possible to set one or more feature points. For example, if only the feature point 823 or 824 close to the half-cut 401 is set to be used as a feature point, the accuracy of determination as a half-cut area may be improved. The button 817 is used to register, as a feature point of a reference image to finally be used at the time of verification, the feature point set to be used by one of the buttons 812 to 816. When the button 817 is operated, the display returns to the screen 720 of FIG. 7B. If any of the feature points is not selected by the buttons 812 to 816, all the feature points are set to be used, similar to the button 812. The set feature point may be emphasized, for example, highlighted in the display portion 801 to be visible by the user.

Figure 9A:
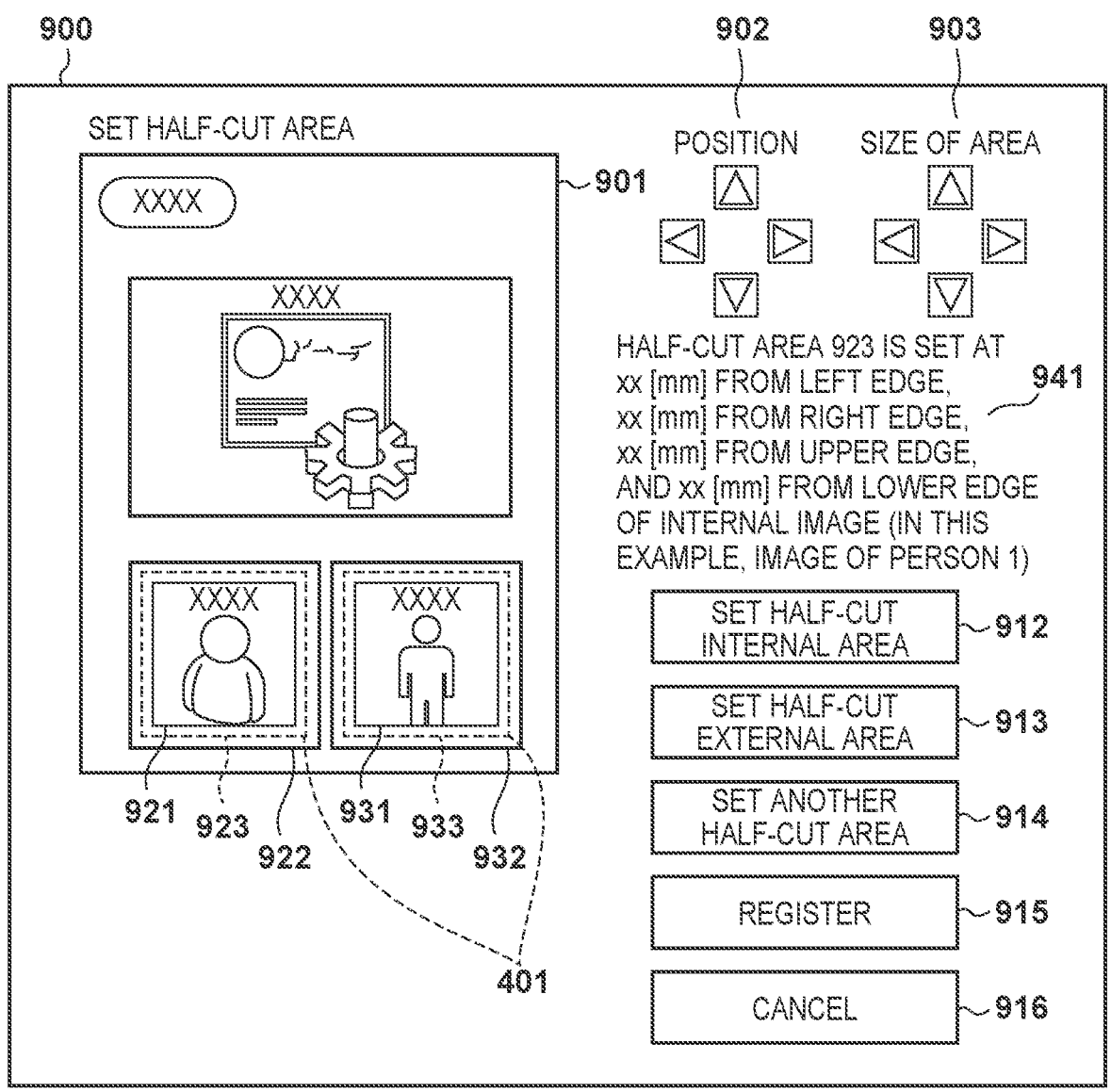
FIGS. 9A and 9B are a view showing examples of a display screen when the verification apparatus sets a half-cut area according to the embodiment.
Figure 9B:
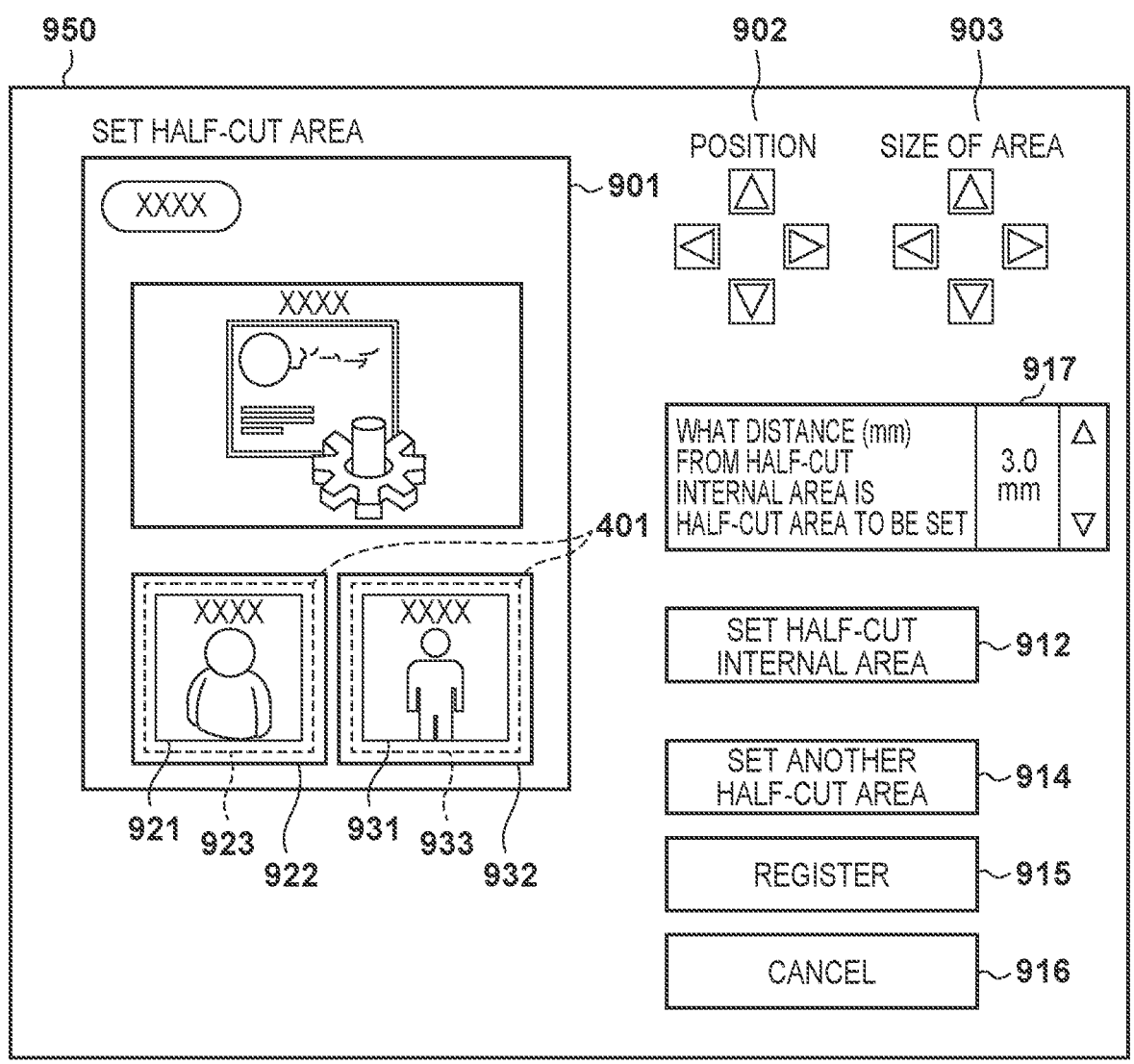

FIGS. 9A and 9B show examples of a screen displayed on the display unit 241 of the verification apparatus 109 when setting an area to be registered as a half-cut area. A screen 900 is displayed when the button 711 of FIGS. 7A and 7B is operated. Two patterns will be described as examples of setting an area (reference region) for which it is determined whether a half-cut is in the area, with reference to the screen 900 and a screen 950.

The screen 900 will be described first. The screen 900 includes display of components 901 to 903, 912 to 916, and 941. In the display portion 901, a reference region set to indicate an area for which it is determined whether a half-cut is in the area is displayed. In this example, two half-cut areas are set, and reference regions for the areas are represented by half-cut areas 923 and 933, respectively. The half-cut area 923 is an area between a half-cut internal area 921 and a half-cut external area 922, which are set in accordance with a user input. In the portion 941, the distances of the half-cut external area 922 from the half-cut internal area 921 of the half-cut area 923 are displayed. Similarly, the half-cut area 933 is an area between a half-cut internal area 931 and a half-cut external area 932 which are set. When the button 914 (to be described later) for setting another half-cut area is operated, setting values concerning the half-cut area 933 are displayed.

A method of setting the half-cut areas 923 and 933 will be described next. In the position setting portion 902 and the area size setting portion 903, the positions and sizes of the half-cut internal area and the half-cut external area can be changed. Each of the position setting portion 902 and the area size setting portion 903 includes upper, lower, left, and right directional keys, and the position and size of the area can be adjusted when each directional key is selected. As a setting example, a region serving as a half-cut internal area is set in the position setting portion 902 and the area size setting portion 903. Then, when the button 912 is operated, the half-cut internal area 921 is set. Next, a region serving as a half-cut external area is set in the position setting portion 902 and the area size setting portion 903. Then, when the button 913 is operated, the half-cut external area 922 is set. If both the half-cut internal area and the half-cut external area are set, an area between them is automatically set as the half-cut area 923.

To set another half-cut area 933, the button 914 for setting another half-cut area is operated to set the half-cut area 933 by the same setting method as that of the half-cut area 923. The button 915 is used to register the set half-cut area. When the button 915 is operated, the display returns to, for example, the screen 720. The button 916 is used to cancel the registration of the half-cut area. When the button 916 is operated, the display returns to, for example, the screen 700 without registering the half-cut area. The set half-cut areas 923 and 933 can be emphasized, for example, highlighted in the display portion 901 to be visible (identifiable) by the user.

With respect to the screen 950, the difference from the screen 900 will be described. The screen 950 includes display of a setting portion 917 instead of the display of the button 913 of the screen 900. More specifically, in the screen 900, the half-cut external area is set by the button 913. However, the screen 950 includes the setting portion 917 for setting a distance (mm) of a position (predetermined position) from the half-cut internal area, to which the half-cut external area is set. When the half-cut internal area is set by the button 912, the half-cut external area is set in accordance with the width set in the setting portion 917. This example shows an example of commonly applying three mm to the upper, lower, left, and right sides. It is also possible to individually set a value to each of the upper, lower, left, and right sides, as a matter of course. Note that after setting the half-cut internal area, the setting portion 917 may be displayed to be settable.

Figure 10:
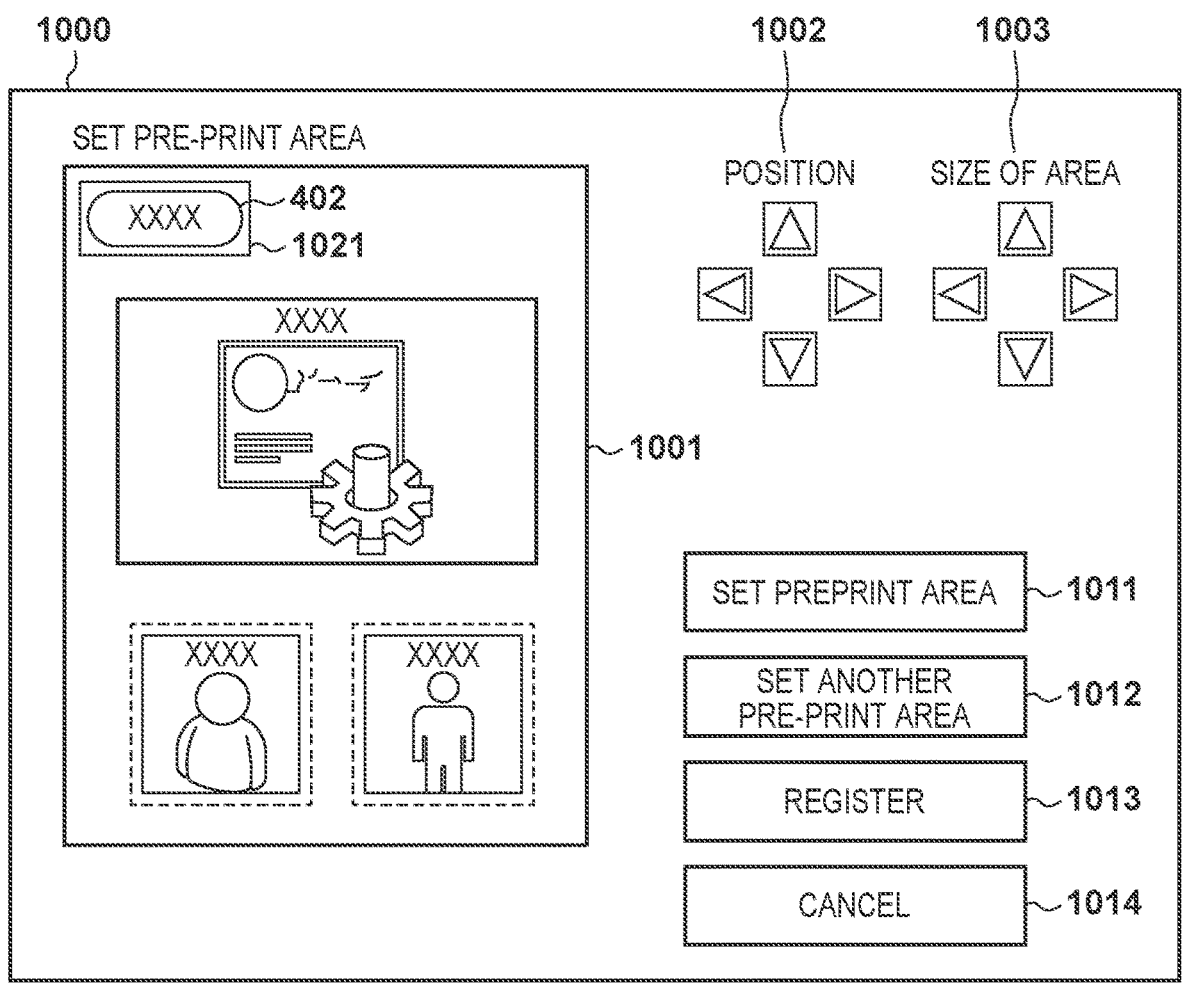
FIG. 10 is a view showing an example of a display screen when the verification apparatus sets a preprint area according to the embodiment.
Figure 12A:
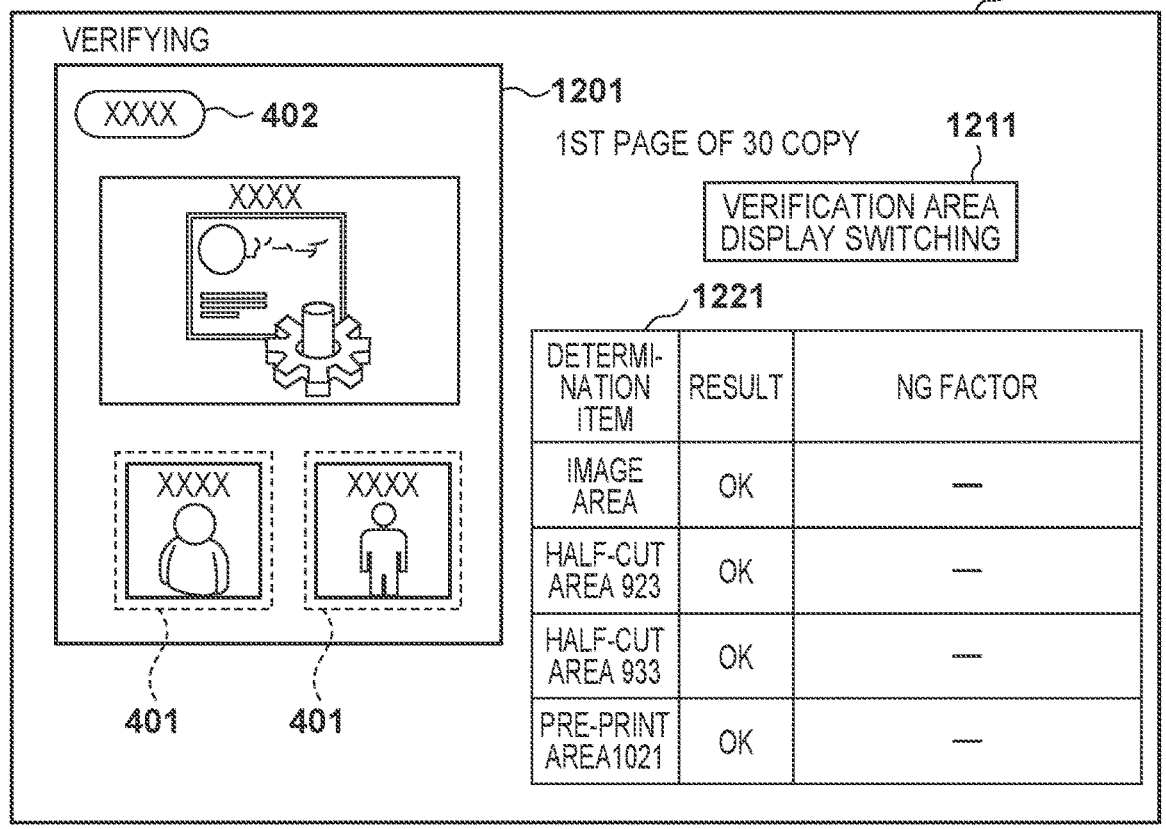
FIGS. 12A to 12D are a view showing examples of a display screen when the verification apparatus displays a verification result according to the embodiment.
Figure 12B:
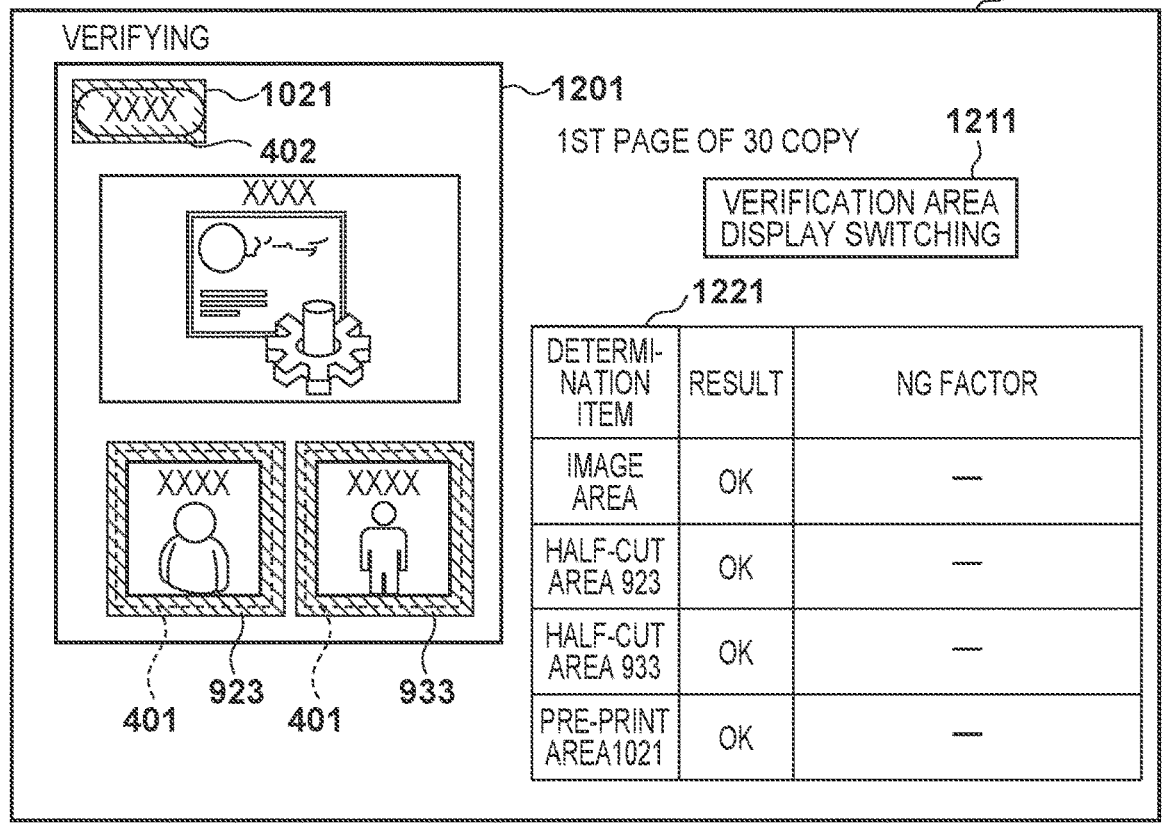
Figure 12C:
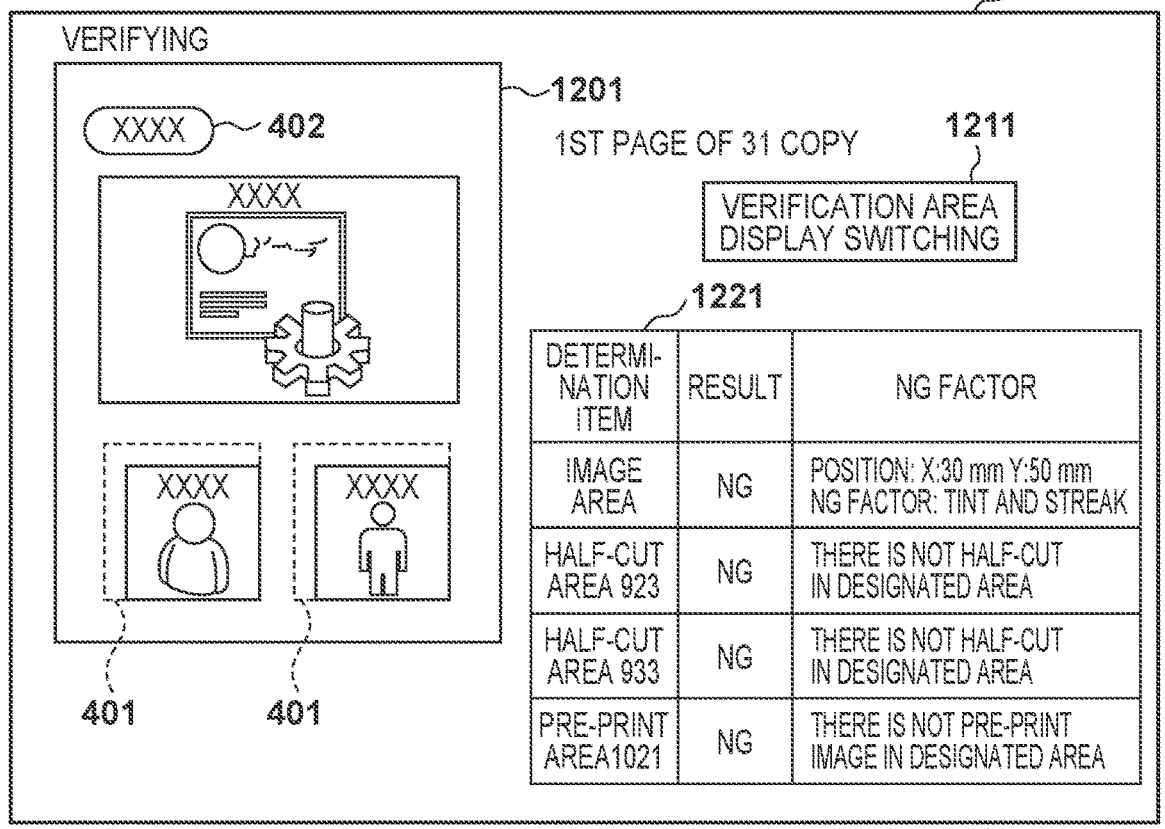
Figure 12D:
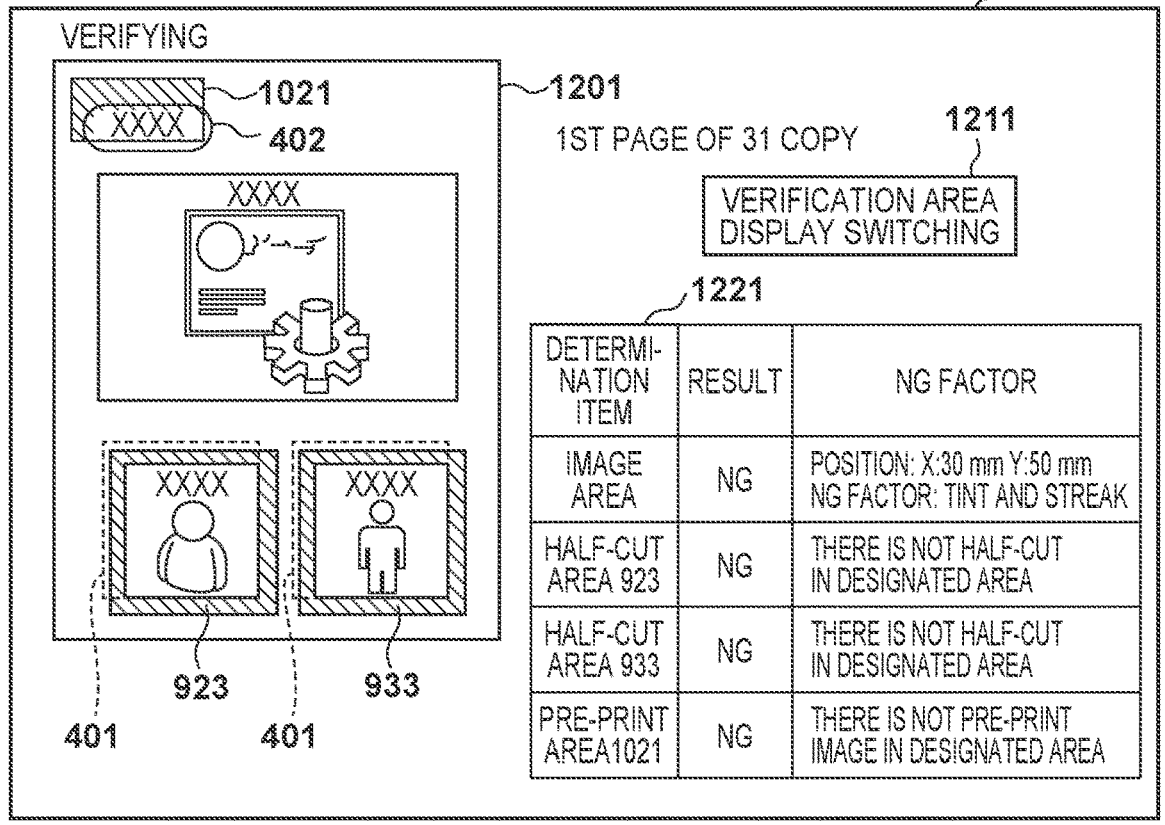

FIG. 10 shows an example of a screen displayed on the display unit 241 of the verification apparatus 109 when setting an area to be registered as a preprint area. A screen 1000 is displayed when the button 712 of the screen 700 or 720 is operated. The screen 1000 includes display of components 1001 to 1003 and 1011 to 1014.

In the display portion 1001, a region to indicate an area for which it is determined whether a preregistered preprint image is in a designated area is displayed. In this example, one preprint area 1021 is set. A method of setting the preprint area 1021 will be described. Each of the position setting portion 1002 and the area size setting portion 1003 includes upper, lower, left, and right directional keys, and the position and size of the preprint area 1021 can be adjusted when each directional key is selected. When setting is made in the position setting portion 1002 and the area size setting portion 1003 and the button 1011 is operated, the setting of the preprint area 1021 is reflected.

To set another preprint area, the button 1012 for setting another preprint area is operated to set the other preprint area by the same setting method as that of the preprint area 1021. The button 1013 is used to register the set preprint area. When the button 1013 is operated, the display returns to, for example, the screen 720. The button 1014 is used to cancel the registration of the preprint area. When the button 1014 is operated, the display returns to, for example, the screen 700 without registering the preprint area. The set preprint area 1021 can be emphasized, for example, highlighted in the display portion 1001 to be visible by the user.

If the feature point, half-cut area, and preprint area are set in the setting screens described with reference to FIGS. 8 to 10, when returning to the verification area setting screen shown in FIGS. 7A and 7B, contents set in the display portion 701 can also be displayed. A display example is the display portion 701 of the screen 720. The user can confirm the registration contents by seeing the displayed settings. With respect to the half-cut areas 923 and 933 and the preprint area 1021 of hatched areas, the verification apparatus 109 does not perform comparison with the reference image (first algorithm). That is, the present invention has as its feature that the verification apparatus 109 performs verification by another algorithm (second algorithm) for determining for the areas (first areas) whether each area includes a half-cut and whether each area includes a preprint image. For an area (second area) that is not hatched, the verification apparatus 109 performs comparison with the reference image, and performs defect determination (first algorithm).

FIG. 11 shows an example of a screen displayed on the display unit 241 of the verification apparatus 109 when setting verification. A screen 1100 is displayed when the button 505 of the screen 500 is operated. The screen 1100 includes display of components 1131 to 1133, and is a screen for setting verification conditions.

The display region 1131 is used to set a verification image. A setting portion 1101 is used to set a verification level. In this region, it is possible to change the verification accuracy. That is, this region is related to setting of a threshold indicating the difference from the comparison target at the time of verification. As the level of the verification accuracy is higher, the verification apparatus 109 determines a defective image even if the difference between the reference image and the read image is small. Therefore, a threshold is set for determining a defective image despite a progressively smaller difference as the level of the verification accuracy is increased. A setting portion 1102 is used to set a verification type. It is possible to set verification items in accordance with the verification purpose of the user. In the example shown in FIG. 11, the position, tint, streak, and lack are verification targets, but the density is excluded from the verification targets. Note that this does not intend to limit the present invention and other verification targets may be displayed to be selectable. The setting portions 1101 and 1102 of the display region 1131 indicate verification settings to be applied to an area other than the hatched areas of the display portion 701 of the screen 720.

The display region 1132 is used to set a preprint area. A setting portion 1111 is used to select an image for determining whether a designated image is in the preprint area. In this example, an image to be compared with the company name logo 402 is set. Another comparison image can be selected by selecting an upper or lower key. The preprint image is also registered in the memory 239 of the verification apparatus 109 in advance, similar to the reference image. The display portion 1112 is used to display the preprint image selected in the setting portion 1111. The setting portion 1111 indicates a verification setting for determining whether the company name logo 402 is in the preprint area 1021 of the screen 720.

The display region 1133 is used to set a half-cut area. Setting portions 1121 and 1123 are used to select the formation pattern of a half-cut for determining whether a half-cut is in the half-cut area. In this example, the screen 720 includes two half-cut areas. Image views 1122 and 1124 show the patterns of the half-cuts selected in the setting portions 1121 and 1123, respectively. In the screen 720, both the two half-cuts 401 have the half-cut pattern of a small dotted line indicated by 1121 and 1122. This is a case in which a small dotted line is also set in the setting portion 1123 used to set the half-cut area 933. The purpose of using 1123 and 1124 is to describe that the present invention can be applied to different half-cut patterns. If there are a plurality of half-cut types, a number of half-cut detection methods corresponding to the number of half-cut types is required. The half-cut detection method needs to be prepared as a verification program to be executed by the CPU 238 of the verification apparatus 109. In this embodiment, half-cut area determination processing in step S313 of FIG. 15B (to be described later) corresponds to the verification program.

FIGS. 12A to 12D show examples of a result screen displayed on the display unit 241 of the verification apparatus 109 after the start of verification. The result screen of FIGS. 12A to 12D is displayed when the button 507 of FIG. 5 is operated. Screens 1230 and 1231 each show an example when verification determination is OK, and screens 1232 and 1233 each show an example when verification determination is NG (abnormal). The screens 1231 and 1233 show examples in which the locations of the verification areas are indicated in the screens 1230 and 1232, respectively.

The screens 1230 and 1231 will first be described. In a display portion 1201, an image of the final sheet read last by the verification apparatus 109 is displayed. In a display portion 1221, a determination item, a determination result, and a factor of an abnormality when determination is NG are displayed. The display portion 1221 displays these items for each of the half-cut areas, the preprint area, and the image area other than the half-cut areas and the preprint area. A result of comparing the image of the final sheet in the display portion 1201 with the reference image is displayed for the image area, a result of determining whether a half-cut is in the half-cut area is displayed for the half-cut area, and a result of determining whether a preprint image is in the preprint area is displayed for the preprint area. A button 1211 is used to switch whether to display a verification area. When the button 1211 is operated, the half-cut areas 923 and 933 and the preprint area 1021 are composited with the read image and displayed to be identifiable, as shown in the screen 1231. It is found that the half-cuts 401 are in the half-cut areas 923 and 933, respectively, and the preprint image 402 is in the preprint area 1021. By compositing and displaying the areas and the read image, the user can readily recognize the positional relationship with the predetermined patterns.

Next, with respect to the screens 1232 and 1233, the difference from the screens 1230 and 1231 will be described. When comparing the screens 1233 and 1231 with each other, it is found that the half-cuts 401 do not fall within the half-cut areas 923 and 933, respectively, and the preprint image 402 also does not fall within the preprint area 1021. In addition, since the preprint image 402 does not fall within the image area, a mismatch with respect to the reference image occurs in the image area. This result is displayed in the display portion 1221 of the screen 1233.

In this example, as NG contents of the image area, only a point that the preprint image in the upper left portion of the display portion 1201 is printed is indicated, and NG is not determined with respect to the half-cuts 401 in the determination result of the image area. The reason for this is that the half-cut is normally, mostly located in a white portion, and has very low density (high luminance). Therefore, if the verification level is increased to the level at which a half-cut can be inspected as an image, defect determination is stricter than the verification level intended by the user, and a tradeoff of increasing a defect rate may occur. In this example, the verification level of the image area is set to a verification level to the extent that OK is determined when the half-cut is located in a white portion.

Since there is such a problem, this embodiment proposes a solution method of separating a half-cut region (first region) from a region (second region) compared with the reference image and determining whether a half-cut is in a designated area. In this example, a verification result is displayed on the display unit 241, as needed, when verification starts by the button 507. However, the information shown in FIGS. 12A to 12D may be stored in the memory 239 at the time of verification processing and then displayed after completion of the verification processing, or may be transmitted to an external apparatus and displayed on the external apparatus.

<Processing Procedure of Printing>

Figure 13:
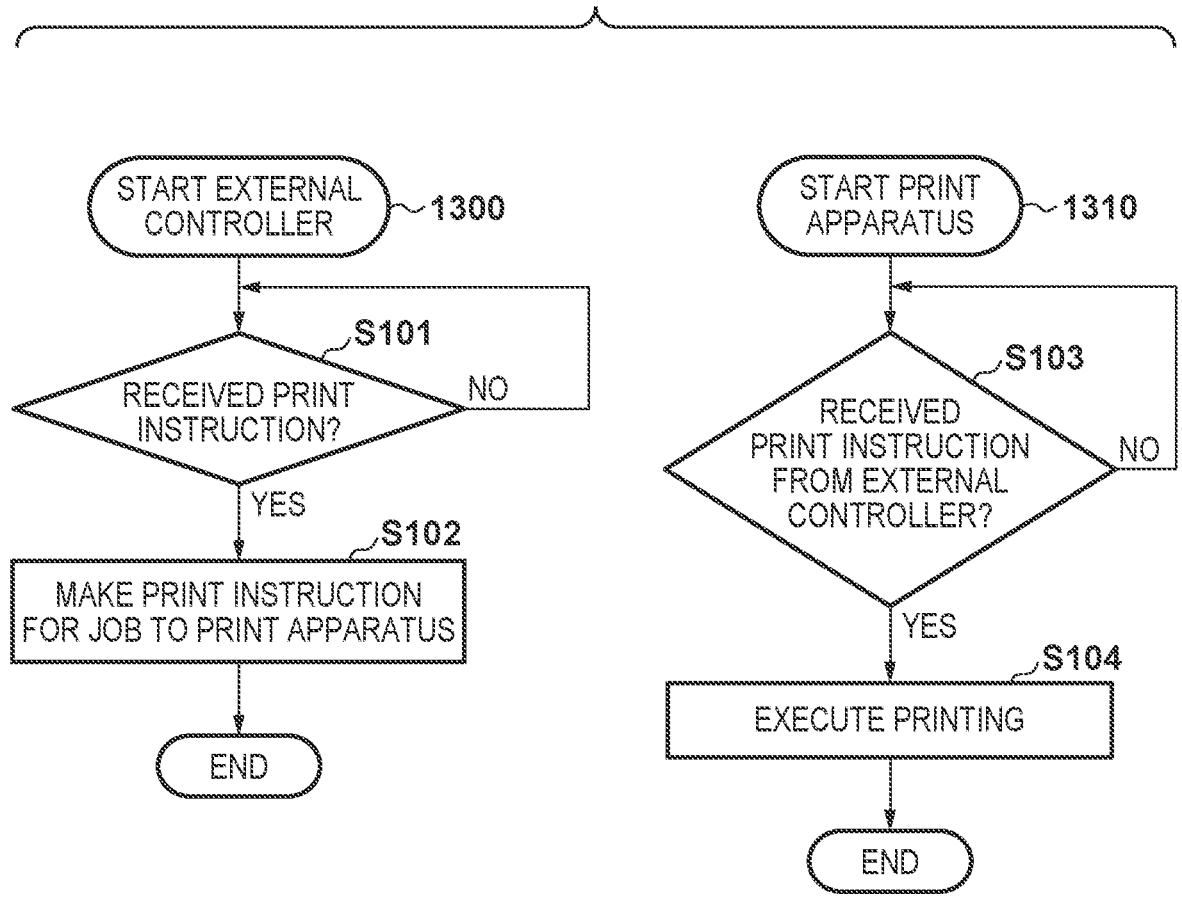
FIG. 13 is a flowchart illustrating the processing procedures of an external controller and a print apparatus according to the embodiment.

The processing procedures of the external controller 102 and the print apparatus 107 when executing printing according to this embodiment will be described with reference to FIG. 13. The processing procedure of the external controller 102 will first be explained with reference to a flowchart 1300. The processing to be described below is implemented when the CPU 208 of the external controller 102 executes the program stored in the memory 209 or the HDD 210.

In step S101, the CPU 208 of the external controller 102 determines whether a print instruction of a print job is received. The print instruction is received from, for example, the PC 103 as an external apparatus. If the print instruction is received, the process advances to step S102, and the CPU 208 inputs print data to the print apparatus 107, and instructs to execute printing, thereby ending the processing.

Subsequently, the processing procedure of the print apparatus 107 will be described with reference to a flowchart 1310. The processing to be described below is implemented when the CPU 222 of the print apparatus 107 reads out the program stored in the memory 223 or the HDD 221 and executes it.

In step S103, the CPU 222 of the print apparatus 107 determines whether the print instruction of the external controller 102 is received. If it is determined in step S103 that the print instruction is received from the external controller 102, the process advances to step S104, and the CPU 222 executes printing in accordance with the job received from the external controller 102. The job received from the external controller 102 includes information of a feeding destination or discharge destination in addition to image data. In accordance with contents of the job received from the external controller 102, the print apparatus 107 controls the inserter 108, the verification apparatus 109, the large capacity stacker 110, and the finisher 111 via the communication cable 254. Setting processing of verification by the verification apparatus 109 will be described later with reference to FIG. 14, and verification processing will be described later with reference to FIGS. 15A and 15B.

<Setting Procedure of Verification>

Figure 14:
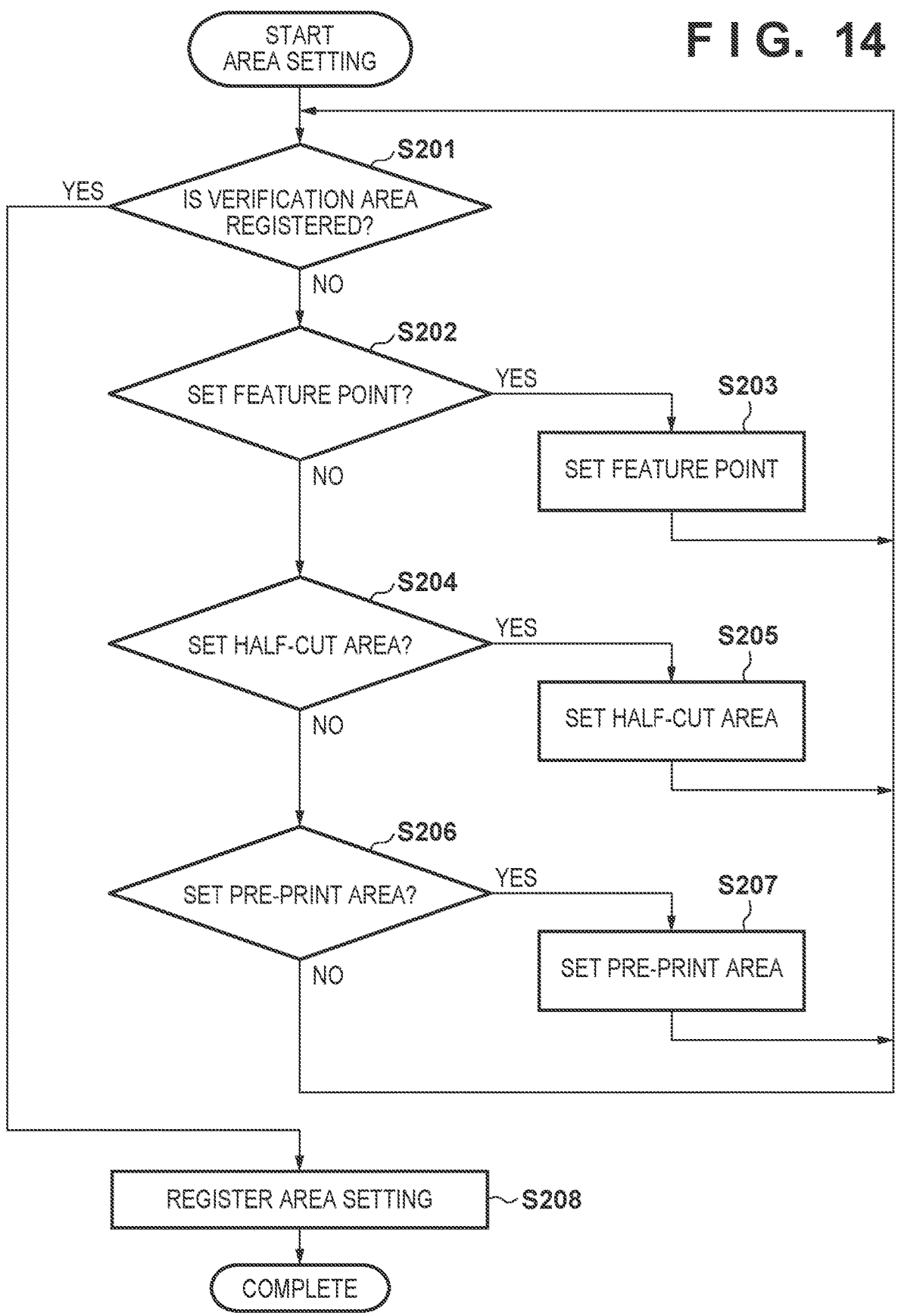
FIG. 14 is a flowchart illustrating a processing procedure when the verification apparatus sets a verification area according to the embodiment.

A processing procedure when setting a verification area to perform verification processing according to this embodiment will be described next with reference to FIG. 14. The processing to be described below is implemented when the CPU 238 of the verification apparatus 109 executes the program stored in the memory 239. In this example, assume that the screens described with reference to FIGS. 5 to 12 are displayed on the display unit 241 of the verification apparatus 109. The screen 500 is displayed first on the display unit 241, and then transitions to each screen by a user input.

In step S201, the CPU 238 determines whether to register the setting of the verification area. For example, the screen 700 or 720 is displayed on the display unit 241, and it is determined whether the button 713 is operated via the operation unit 242. If it is determined in step S201 to register the verification area, that is, if the button 713 is operated, the process advances to step S208, and the CPU 238 registers all settings made in steps S203, S205, and S207 (to be described later), and ends the processing. On the other hand, if it is determined in step S201 not to register the verification area, that is, if the button 713 is not operated, the process advances to step S202.

In step S202, the CPU 238 determines whether a feature point on the reference image is set. That is, it is determined whether the button 710 is operated in the screen 700 or 720. If it is determined in step S202 to set a feature point, the process advances to step S203. Otherwise, the process advances to step S204. In step S203, the CPU 238 sets the feature point on the reference image. That is, the CPU 238 displays the screen 800 of FIG. 8 described above on the display unit 241, accepts a user input via the operation unit 242, and sets one or more feature points on the reference image from a plurality of feature point candidates. Upon detecting the operation of the button 817 of the screen 800, the process terminates step S203 and returns to step S201.

In step S204, the CPU 238 determines whether to set a half-cut area (reference region). That is, it is determined whether the button 711 is operated in the screen 700 or 720. If it is determined in step S204 to set a half-cut area, the process advances to step S205. Otherwise, the process advances to step S206. In step S205, the CPU 238 sets a half-cut area. That is, the CPU 238 displays the screen 900 or 950 of FIGS. 9A and 9B described above on the display unit 241, and accepts a user input via the operation unit 242 to set a half-cut area. Upon detecting the operation of the button 915 of the screen 900 or 950, the process terminates step S205 and returns to step S201.

In step S206, the CPU 238 determines whether to set a preprint area (reference region). That is, it is determined whether the button 712 is operated in the screen 700 or 720. If it is determined in step S206 to set a preprint area, the process advances to step S207. Otherwise, the process returns to step S201. In step S207, the CPU 238 sets a preprint area. That is, the CPU 238 displays the screen 1000 of FIG. 10 described above on the display unit 241, and accepts a user input via the operation unit 242 to set a preprint area. Upon detecting the operation of the button 1013 of the screen 1000, the process terminates step S207 and returns to step S201.

<Processing Procedure of Verification>

Figure 15A:
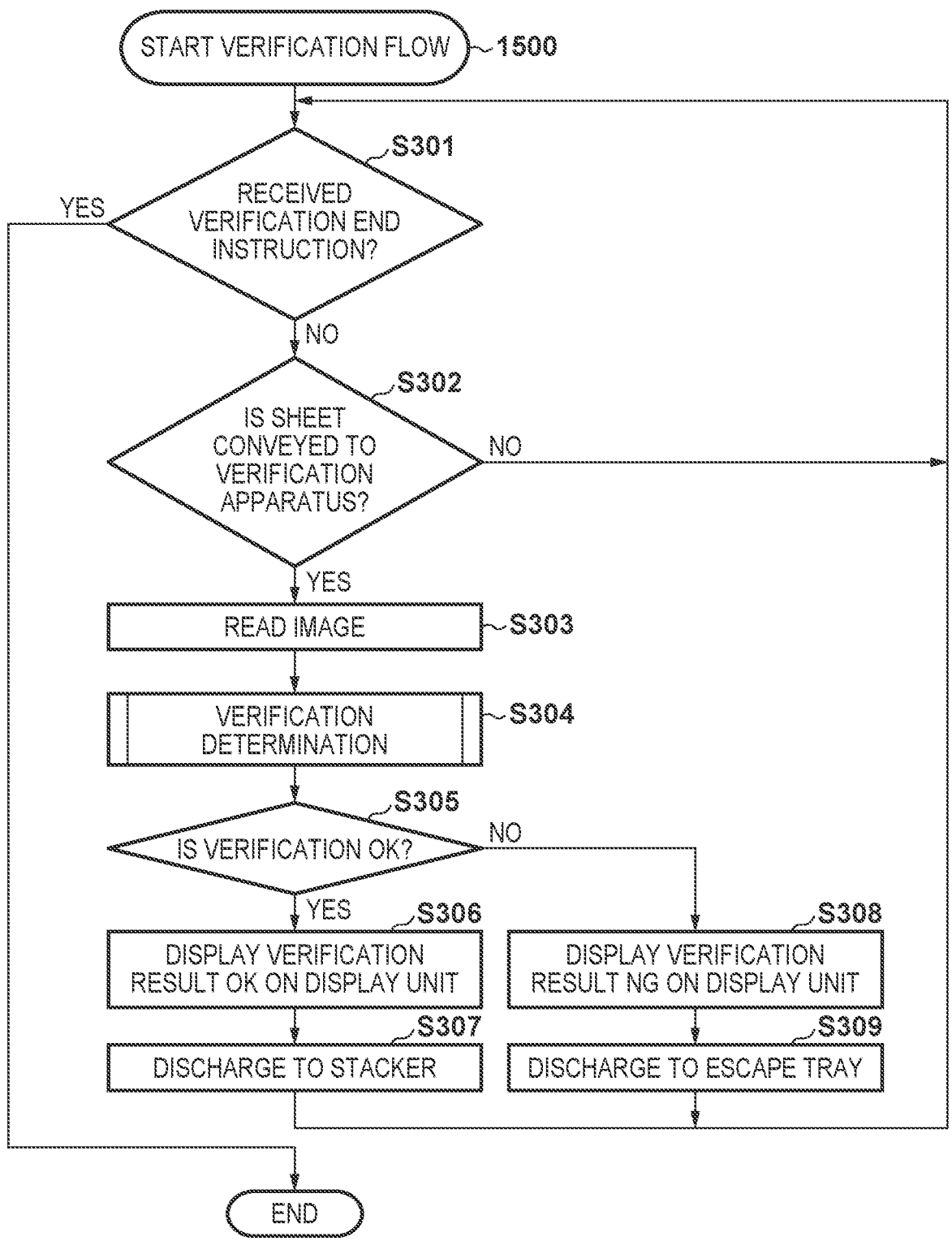

The verification processing according to this embodiment will be described next with reference to FIGS. 15A and 15B. A flowchart 1500 illustrates a processing procedure performed by the verification apparatus 109 when executing the verification processing. The processing to be described below is implemented when the CPU 238 of the verification apparatus 109 executes the program stored in the memory 239. If a verification area is set in the screen 500, and then the verification start button 507 is operated, the processing of this flowchart starts.

In step S301, the CPU 238 of the verification apparatus 109 determines whether a verification end instruction is received. If the verification end instruction is received, the processing of the verification apparatus 109 ends. Otherwise, the process advances to step S302. In step S302, the CPU 238 determines whether the final sheet is conveyed to the verification apparatus 109. The final sheet is a sheet finally output from the print apparatus 107 after printing, as described above, and indicates a verification target sheet. If the final sheet is not conveyed, the process returns to step S301. Otherwise, the process advances to step S303.

In step S303, the CPU 238 reads the image of the sheet using at least one of the cameras 331 and 332, and saves the read image in the memory 239 of the verification apparatus 109. The saved image is displayed in the display portion 1201 of FIGS. 12A to 12D. Subsequently, the process advances to step S304, the CPU 238 compares the final sheet read in step S303 with the reference image, determines whether a half-cut is in the half-cut area, and determines whether a preprint image is in the preprint area, and the process advances to step S305. As a determination result, the determination items displayed in the display portion 1221 of FIGS. 12A to 12D are determined. Detailed determination processing will be described later with reference to a flowchart 1510.

In step S305, the CPU 238 confirms the results of the determination processes in step S304. If all the determination results of the half-cut area, the preprint area, and the image area as an area other than those areas are normal (verification OK), the process advances to step S306. Otherwise, the process advances to step S308. In step S306, the CPU 238 displays, on the display unit 241 of the verification apparatus 109, information indicating that the verification result is OK. For example, each of the screens 1230 and 1231 is an example of the screen displayed in step S306. Subsequently, the process advances to step S307, and the CPU 238 instructs the print apparatus 107 to discharge the print sheet to the stack tray 341 of the large capacity stacker 110, and then returns the process to step S301.

On the other hand, if a defect (verification NG) is determined in step S305, the process advances to step S308, and the CPU 238 displays, on the display unit 241, information indicating that the verification result is NG. For example, each of the screen 1232 and 1233 is an example of the screen displayed in step S308. Subsequently, the process advances to step S309, and the CPU 238 instructs the print apparatus 107 to discharge the print sheet to the escape tray 346 of the large capacity stacker 110, and then returns the process to step S301.

Subsequently, details of the verification determination processing in step S304 described above will be explained with reference to the flowchart 1510 shown in FIG. 15B.

In step S311, the CPU 238 extracts the feature point set in step S203 from the image of the final sheet read in step S303. More specifically, the CPU 238 extracts, as a feature point, a position similar to information (luminance value and a position) concerning the set feature point based on the luminance value and position of the read image. To reduce the processing load, it may be determined whether there is a similar pixel position by centering the position of the set feature point. Furthermore, the feature point may be formed from a plurality of pixels, and if a predetermined number or more of pixels among the plurality of pixels are similar, that position may be extracted as a feature point. Subsequently, in step S312, the CPU 238 executes affine transformation (rotation processing) so that the position of the feature point extracted in step S311 coincides with the position of the feature point of the reference image. This is done to prevent, when the final sheet is shifted due to skewing, or the like, and read at the time of reading the final sheet, the shift of the read position from being determined as a shift of an image formation position. By executing the transformation, the CPU 238 can specify, on the read image, as the first region, a region that should be the preset half-cut area or preprint area (reference region) and the remaining region as the second region based on the feature point extracted in step S311. Based on the positional relationship between the feature point on the reference image set via the buttons 710 to 712 and the reference region as a region where the predetermined pattern should be formed, the first region is specified from the image position of the feature point extracted in step S311.

In step S313, with respect to the image having undergone affine transformation in step S312, the CPU 238 determines whether the half-cut pattern set in the screen 1100 of FIG. 11 exists in the half-cut area set in step S205. As described when explaining the screen 1100, individual determination processing needs to be prepared as the determination processing of determining whether the half-cut pattern exists in the area. For example, to detect whether a half-cut is in a white portion, processing of detecting whether a dotted line of a luminance lower than the luminance of white even by a small value (predetermined value) continuously exists in one round of the half-cut area is performed since the luminance of white is very high.

In step S314, with respect to the image having undergone affine transformation in step S312, the CPU 238 determines whether the preprint image set in the screen 1100 of FIG. 11 exists in the preprint area set in step S207. In this example, it is determined whether the preset preprint image exists in the preprint area. Subsequently, in step S315, with respect to the image having undergone affine transformation in step S312, the CPU 238 performs comparison with the reference image for the region that has not been set as a half-cut area or a preprint area in the setting processing shown in FIG. 14. Items to be compared in step S315 are determined based on the verification level set in the setting portion 1101 and the verification type set in the setting portion 1102 in FIG. 11. When the processing in step S315 ends, this process ends.

Processing contents of the verification determination processing in the flowchart 1510 will additionally be described with reference to FIG. 16. In 1601, an example of setting after setting the verification areas in the screen 720 is shown.

Each of 1602 to 1604 shows the state of the final sheet that is the same as each of the sheets 414 to 416 of FIG. 4, and also shows the image read in step S303 of the flowchart 1500. The feature points 822, 823, and 824 extracted in step S310 of the flowchart 1510 are overlapped and displayed in each of 1602 to 1604.

Each of 1605 to 1607 shows a state after the processing in step S311 obtained by performing affine transformation for each of the images 1602 to 1604 so that the positions of the feature points extracted in step S310 of the flowchart 1510 coincide with those of the feature points of the reference image. Furthermore, the half-cut areas 923 and 933 and the preprint area 1021 set in steps S205 and S207 of FIG. 14 are overlaid and displayed on the images after affine transformation. In step S313 to S315 described above, the determination processing is performed using the images corresponding to 1605 to 1607.

As described above, the verification apparatus according to this embodiment sets a feature point of a reference image as a verification target image, and a reference region of a predetermined pattern formed in advance on a recording medium on which the verification target image is to be formed. The verification apparatus extracts the set feature point from a read image obtained by reading an image formed on the recording medium by the print apparatus. Based on the positional relationship between the set feature point and the reference region, the verification apparatus specifies, from the image position of the extracted feature point, the first region on the read image, which indicates a region where the predetermined pattern should have been formed, and the second region other than the first region of the read image. Furthermore, the verification apparatus performs verification for the first region by the first algorithm, and performs verification for the second region by the second algorithm different from the first algorithm. As described above, according to this embodiment, the first region where the predetermined pattern is formed and the second region as the image region other than the first region are specified, and verification is performed for each region by an appropriate algorithm. Thus, according to the present invention, it is possible to confirm whether the positions of a half-cut and a preprint image are ensured while ensuring an image by comparing the image of the printed print sheet with the reference image.

According to the present invention, it is possible to preferably inspect the positions of a half-cut and a preprint image while ensuring the quality of a print image by image inspection.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the invention is defined by the following claims.

What is claimed is:

1. A verification apparatus comprising:
a controller including a processor and a memory, the controller configured:
to display, on a display unit, a screen in which a reference image as a verification target image is selectable in accordance with a user input;
to set, in accordance with a user input and on the displayed reference image, a feature point of the reference image, and a reference region of a predetermined pattern formed in advance on a recording medium on which the verification target image is to be formed;
to extract the set feature point from a read image obtained by reading an image formed on the recording medium by a print apparatus;
to specify, based on a positional relationship between the feature point and the reference region set via the screen, from an image position of the extracted feature point, a first region on the read image, which indicates a region where the predetermined pattern should have been formed, and a second region other than the first region of the read image;
to perform verification for the first region by a first algorithm, and verification for the second region by a second algorithm different from the first algorithm; and
to set, in a case when the predetermined pattern is a half-cut, an area between an internal area and an external area of the half-cut set in accordance with a user input as the first region, and to set an area other than the set first region as the second region.

2. The verification apparatus according to claim 1, wherein the controller is further configured:
to perform, in the first algorithm, verification by determining whether the predetermined pattern formed in advance on the recording medium is in the first region; and
to perform, in the second algorithm, verification by comparing an image of the second region with the reference image.

3. The verification apparatus according to claim 1, wherein the predetermined pattern is at least one of a half-cut and a preprint image.

4. The verification apparatus according to claim 3, wherein the controller is further configured to determine, in a case when the predetermined pattern is a half-cut, in the first algorithm, whether the predetermined pattern is in the first region by determining whether a dotted line of a luminance lower than a luminance value of white by a predetermined value is in the first region.

5. The verification apparatus according to claim 3, wherein a feature point at a position close to the predetermined pattern is selected as the set feature point.

6. The verification apparatus according to claim 5, wherein the controller is further configured, in a case when the predetermined pattern is a half-cut, to display, on a display unit, a screen in which an internal area and an external area of the half-cut are settable in accordance with a user input, and to set the set internal area and the set external area as the first region.

7. The verification apparatus according to claim 5, wherein the controller is further configured, in a case when the predetermined pattern is a half-cut, to display, on a display unit, a screen in which an internal area of the half-cut is settable in accordance with a user input, and to set, as the first region, the set internal area and an external area from the set internal area to a predetermined position.

8. The verification apparatus according to claim 7, wherein the controller is further configured to set a distance from the internal area to the predetermined position via the screen displayed on the display unit.

9. The verification apparatus according to claim 5, wherein the controller is further configured to set a formation pattern of a half-cut.

10. The verification apparatus according to claim 3, wherein the controller is further configured:
to display, in a case when the predetermined pattern is a preprint image, on a display unit, a screen in which the preprint image is selectable in accordance with a user input; and
to verify the first region by determining whether the set preprint image is in the specified first region.

11. The verification apparatus according to claim 3, wherein the controller is further configured to display, in the second algorithm, on a display unit, a screen in which a verification type and a verification level, indicating a level of a difference between the read image and the reference image, for detecting a defective image are settable in accordance with a user input.

12. The verification apparatus according to claim 11, wherein the verification type includes at least one of a position of an image, a tint, a density, a streak, and a lack of printing.

13. The verification apparatus according to claim 1, wherein the controller is further configured to display, on the screen, a plurality of feature points extractable from the reference image so as to be able to select at least one of the plurality of feature points.

14. The verification apparatus according to claim 1, wherein a plurality of different predetermined patterns are formed in advance on the recording medium.

15. The verification apparatus according to claim 1, wherein the controller is further configured to display, on a display unit, a result screen showing the read image of a verification target, a verification result for each item, and a factor of an abnormality when the verification result is abnormal.

16. The verification apparatus according to claim 15, wherein, in the result screen, it is possible to switch whether to composite and to display, on display of the read image, the first region to be identifiable.

17. The verification apparatus according to claim 1, further comprising:
 a conveyance path to which the recording medium printed by the print apparatus is conveyed; and
 a reading unit configured to read the image of the recording medium conveyed to the conveyance path.

18. The verification apparatus according to claim 17, wherein the reading unit includes two cameras sandwiching the conveyance path, and is configured to read two surfaces of the recording medium conveyed to the conveyance path.

19. The verification apparatus according to claim 1, wherein the controller is further configured to specify the first region and the second region after performing rotation processing for the read image.

20. A control method for controlling a verification apparatus, the method comprising:
 displaying, on a display unit, a screen in which a reference image as a verification target image is selectable in accordance with a user input;
 setting, in accordance with a user input and on the displayed reference image, a feature point of the reference image, and a reference region of a predetermined pattern formed in advance on a recording medium on which the verification target image is to be formed;
 extracting the set feature point from a read image obtained by reading an image formed on the recording medium by a print apparatus;
 specifying, based on a positional relationship between the feature point and the reference region, both of which have been set via the screen, from an image position of the extracted feature point, a first region on the read image, which indicates a region where the predetermined pattern should have been formed, and a second region other than the first region of the read image;
 performing verification for the first region by a first algorithm, and verification for the second region by a second algorithm different from the first algorithm; and
 setting, in a case when the predetermined pattern is a half-cut, an area between an internal area and an external area of the half-cut set in accordance with a user input as the first region, and setting an area other than the set first region as the second region.

21. A non-transitory computer-readable storage medium storing a computer program for causing a computer to execute each step of a control method for controlling a verification apparatus, the control method comprising:
 displaying, on a display unit, a screen in which a reference image as a verification target image is selectable in accordance with a user input;
 setting, in accordance with a user input and on the displayed reference image, a feature point of the reference image, and a reference region of a predetermined pattern formed in advance on a recording medium on which the verification target image is to be formed;
 extracting the set feature point from a read image obtained by reading an image formed on the recording medium by a print apparatus;
 specifying, based on a positional relationship between the feature point and the reference region, both of which have been set via the screen, from an image position of the extracted feature point, a first region on the read image, which indicates a region where the predetermined pattern should have been formed, and a second region other than the first region of the read image;
 performing verification for the first region by a first algorithm, and verification for the second region by a second algorithm different from the first algorithm; and
 setting, in a case when the predetermined pattern is a half-cut, an area between an internal area and an external area of the half-cut set in accordance with a user input as the first region, and setting an area other than the set first region as the second region.

* * * * *